(12) United States Patent
Liu et al.

(10) Patent No.: US 12,233,734 B2
(45) Date of Patent: *Feb. 25, 2025

(54) AUTONOMOUS MOBILE DEVICE AND WIRELESS CHARGING SYSTEM THEREOF

(71) Applicant: Positec Power Tools (Suzhou) Co., Ltd., Suzhou (CN)

(72) Inventors: Fangshi Liu, Suzhou (CN); Gen Sun, Suzhou (CN); Yongming Dong, Suzhou (CN); Chang Zhou, Suzhou (CN); Shiping Jiao, Suzhou (CN); Jiang Du, Suzhou (CN)

(73) Assignee: Positec Power Tools (Suzhou) Co., LTD., Suzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/221,164

(22) Filed: Apr. 2, 2021

(65) Prior Publication Data
US 2021/0221246 A1 Jul. 22, 2021

Related U.S. Application Data

(63) Continuation of application No. 15/739,892, filed as application No. PCT/CN2016/087290 on Jun. 27, 2016, now Pat. No. 10,967,752.

(30) Foreign Application Priority Data

Jun. 26, 2015 (CN) .............................. 201510363711
Jun. 26, 2015 (CN) .............................. 201520449780
(Continued)

(51) Int. Cl.
*B60L 53/62* (2019.01)
*A01D 34/00* (2006.01)
(Continued)

(52) U.S. Cl.
CPC ............ *B60L 53/62* (2019.02); *A01D 34/008* (2013.01); *A47L 9/2873* (2013.01); *B60L 53/12* (2019.02);
(Continued)

(58) Field of Classification Search
None
See application file for complete search history.

(56) References Cited

U.S. PATENT DOCUMENTS 5,440,216 A * 8/1995 Kim ...................... A47L 9/2884
15/340.1
5,869,910 A * 2/1999 Colens .................... H02J 50/90
700/218
(Continued)

FOREIGN PATENT DOCUMENTS

AU 2010348406 9/2012
CA 2752037 3/2012
(Continued)

OTHER PUBLICATIONS

International Searching Authority: the International Search Report and Written Opinion of PCT Serial No. PCT/CN2016/087290; 10 Pages; dated Dec. 29, 2016.

*Primary Examiner* — David V Henze-Gongola
(74) *Attorney, Agent, or Firm* — Lee & Hayes, P.C.

(57) ABSTRACT

An autonomous moving device wireless charging system, including an autonomous moving device and a wireless charging station, the wireless charging station includes a wireless charging transmitting end; the autonomous moving device includes: a wireless charging receiving end, the wireless charging transmitting end wirelessly transmits a charging signal to the wireless charging receiving end to transmit electric energy; a charging battery, electrically connected to the wireless charging receiving end, to receive the electric energy transmitted from the wireless charging
(Continued)

receiving end; a wireless charging locating module, the wireless charging locating module determines whether the autonomous moving device is at a charging location; a driving module; and a control module, connected to the wireless charging locating module and driving module, when the wireless charging locating module determines that the autonomous moving device is at the charging location, controlling the driving module, to make the autonomous moving device dock at the charging location.

20 Claims, 16 Drawing Sheets

(30) Foreign Application Priority Data

| Nov. 13, 2015 | (CN) | 201510779800 |
| Dec. 14, 2015 | (CN) | 201510925289 |
| Mar. 15, 2016 | (CN) | 201610146470 |
| Apr. 22, 2016 | (CN) | 201610255347 |

(51) Int. Cl.

| A47L 9/28 | (2006.01) |
| B60L 53/12 | (2019.01) |
| B60L 53/126 | (2019.01) |
| B60L 53/36 | (2019.01) |
| B60L 53/38 | (2019.01) |
| G05D 1/00 | (2024.01) |
| H02J 7/00 | (2006.01) |
| H02J 50/10 | (2016.01) |
| H02J 50/90 | (2016.01) |

(52) U.S. Cl.
CPC ............ *B60L 53/126* (2019.02); *B60L 53/36* (2019.02); *B60L 53/38* (2019.02); *G05D 1/0225* (2013.01); *G05D 1/0278* (2013.01); *H02J 7/0013* (2013.01); *H02J 50/10* (2016.02); *H02J 50/90* (2016.02); *A47L 2201/02* (2013.01); *B60L 2260/32* (2013.01)

(56) References Cited

U.S. PATENT DOCUMENTS

| 10,967,752 | B2* | 4/2021 | Liu | B60L 53/126 |
| 2007/0142964 | A1* | 6/2007 | Abramson | A47L 9/2852 |
| | | | | 700/245 |
| 2008/0009984 | A1 | 1/2008 | Lee et al. | |
| 2011/0095618 | A1* | 4/2011 | Schatz | H02J 50/70 |
| | | | | 307/104 |
| 2012/0074891 | A1 | 3/2012 | Anderson et al. | |
| 2013/0038272 | A1* | 2/2013 | Sagata | H02J 50/80 |
| | | | | 320/108 |
| 2013/0066484 | A1 | 3/2013 | Markusson et al. | |
| 2013/0228198 | A1 | 9/2013 | Hung et al. | |
| 2013/0228199 | A1 | 9/2013 | Hung et al. | |
| 2013/0338853 | A1 | 12/2013 | Hsu et al. | |
| 2014/0031979 | A1* | 1/2014 | Borinato | G05D 1/0265 |
| | | | | 901/1 |
| 2014/0340035 | A1 | 11/2014 | Maekawa | |
| 2015/0077045 | A1* | 3/2015 | Harris | B60L 50/51 |
| | | | | 320/108 |
| 2015/0214086 | A1* | 7/2015 | Hofmeister | H02J 50/10 |
| | | | | 414/744.5 |
| 2016/0165795 | A1* | 6/2016 | Balutis | G05D 1/0265 |
| | | | | 701/25 |
| 2018/0370376 | A1 | 12/2018 | Liu | |
| 2018/0373258 | A1* | 12/2018 | Fici | G05D 1/0276 |

FOREIGN PATENT DOCUMENTS

| CN | 100493857 | 6/2009 |
| CN | 102545284 | 7/2012 |
| CN | 102545285 | 7/2012 |
| CN | 102570519 | 7/2012 |
| CN | 102811604 | 12/2012 |
| CN | 102856941 | 1/2013 |
| CN | 102858584 A | 1/2013 |
| CN | 103142183 A | 6/2013 |
| CN | 203138351 | 8/2013 |
| CN | 103284662 | 9/2013 |
| CN | 103294056 A | 9/2013 |
| CN | 103296774 | 9/2013 |
| CN | 103507067 | 1/2014 |
| CN | 103580293 | 2/2014 |
| CN | 104081482 | 10/2014 |
| CN | 104298241 A | 1/2015 |
| CN | 104578251 | 4/2015 |
| CN | 204858702 | 12/2015 |
| CN | 106300578 | 1/2017 |
| CN | 106877420 | 6/2017 |
| DE | 102013100771 | 9/2013 |
| EP | 1706797 | 10/2006 |
| EP | 2547191 | 1/2013 |
| EP | 2658073 | 10/2013 |
| EP | 2814047 | 12/2014 |
| EP | 2852029 | 3/2015 |
| IL | 215266 | 2/2012 |
| JP | 0764638 | 3/1995 |
| JP | 2013180203 | 9/2013 |
| JP | 2013180204 | 9/2013 |
| JP | 2013180205 | 9/2013 |
| JP | 6107667 | 4/2017 |
| KR | 1020110091821 | 8/2011 |
| TW | 201336457 | 9/2013 |
| TW | 201336467 | 9/2013 |
| TW | 201336468 | 9/2013 |
| TW | 499401 | 9/2015 |
| WO | 2011115535 | 9/2011 |
| WO | 2012083589 | 6/2012 |
| WO | 2014015788 | 1/2014 |
| WO | 2014027946 | 2/2014 |
| WO | 2013118745 | 5/2015 |
| WO | 2016086806 | 6/2016 |
| WO | 2016206648 | 12/2016 |

* cited by examiner

AUTONOMOUS MOBILE DEVICE AND WIRELESS CHARGING SYSTEM THEREOF

BACKGROUND

Technical Field

The present invention relates to the field of robots, and in particular, to an autonomous mobile device and a wireless charging system thereof.

Related Art

As intelligentization develops quicker, a lawn mower is autonomously operated instead of being manually operated. Therefore, not only can people mow grass at an obviously higher speed, but also a great convenience is brought. In addition, the application range of wireless charging technology becomes wider. In particular, the technology is applied to various intelligent devices, such as mobile phones. Complex interface connections are reduced by using wireless charging, so that the charging is easier, and the user experience is improved.

However, a wired charging manner is universally used for an autonomous lawn mower and requires a wired charging station to be constructed on a lawn, causing vegetation to be impossible to grow at a place covered by the charging station on the lawn. The wired charging station generally forms a hump relative to the ground, and a pole piece has a sharp shape, easy to trip over the elderly and cause the children to be accidentally harmed. The wired charging station requires a pole piece to be exposed. Subsequently, it is easy for the pole piece to be eroded and oxidized, causing poor contact, and a problem often occurs during wired charging. In addition, it is easy for the exposure of the pole piece to cause electricity leakage.

In addition, a wireless charging device includes a receiving end and a transmitting end. Usually, when the receiving end and the transmitting end correspond to charge, it is difficult for the receiving end and the transmitting end to be fully aligned. Therefore, the receiving end and the transmitting end cannot be optimally charged. To conveniently align the receiving end and the transmitting end, the transmitting end may be fastened to a support or a charging station, and the receiving end and the transmitting end may be manually aligned. Alternatively, a charging area may be drawn for the transmitting end, to artificially align the receiving end with the transmitting end in the charging area. In a routine technology, regardless of which charging technology is used, the transmitting end needs to be manually aligned with the receiving end. However, this charging manner is obviously inapplicable to a large machinery device, that is, the autonomous lawn mower. Therefore, a system that can automatically make the receiving end and the transmitting end aligned and fastened is needed, to charge a large device like the autonomous lawn mower.

SUMMARY

To resolve the foregoing problem, an embodiment of the present invention provides an autonomous moving device wireless charging system, including an autonomous moving device and a wireless charging station, where the wireless charging station includes a wireless charging transmitting end; and the autonomous moving device includes: a wireless charging receiving end, where the wireless charging transmitting end wirelessly transmits a charging signal to the wireless charging receiving end to transmit electric energy; a charging battery, electrically connected to the wireless charging receiving end, to receive the electric energy transmitted from the wireless charging receiving end; a wireless charging locating module, where the wireless charging locating module determines whether the autonomous moving device is at a charging location; a driving module, driving the autonomous moving device to move; and a control module, connected to the wireless charging locating module and driving module, and when the wireless charging locating module determines that the autonomous moving device is at the charging location, controlling the driving module, to make the autonomous moving device dock at the charging location.

In one embodiment thereof, at the charging location, the wireless charging transmitting end and the wireless charging receiving end are aligned.

In one embodiment thereof, the autonomous moving device includes a wireless charging station locating module, and the wireless charging station locating module locates a location of the wireless charging station, and sends the location of the wireless charging station to the control module; and the control module controls the driving module according to the location of the wireless charging station, to make the autonomous moving device move towards the wireless charging station.

Further, the autonomous moving device wireless charging system further includes a directing line that extends outwards from the wireless charging station, the wireless charging station locating module includes a directing line search module, the directing line search module searches for the directing line, and the control module controls the driving module, to make the autonomous moving device move along the directing line to reach the wireless charging station.

Further, the directing line is a signal line for transmitting an electromagnetic signal outwards, and the directing line search module is an electromagnetic signal sensor.

Further, the wireless charging station locating module includes at least one of a GPS module, a Bluetooth module, a Zigbee module, or a WiFi module.

In one embodiment thereof, the wireless charging locating module determines a distance from the autonomous moving device to the charging location, and the control module controls the driving module according to the distance or a change of the distance, to make the autonomous moving device move towards the charging location.

Further, when the distance is decreased to a first preset distance, the control module controls the driving module, to reduce a moving speed of the autonomous moving device.

In one embodiment thereof, the wireless charging locating module includes a charging signal detection module, and the charging signal detection module detects whether intensity of a charging signal received by the wireless charging receiving end reaches a predetermined value, and when the intensity of the charging signal reaches the predetermined value, determines that the autonomous moving device is at the charging location.

Further, the charging signal detection module determines whether the intensity of the charging signal reaches a preset value by detecting whether a current or a voltage generated on a charging circuit of a charging battery by the charging signal reaches a predetermined value.

Further, the charging signal detection module determines a distance from the autonomous moving device to the charging location according to the intensity of the charging signal, and the control module controls the driving module according to the distance or a change of the distance, to make the autonomous moving device move towards the charging location.

Further, when the distance is decreased to a first preset distance, the control module controls the driving module, to reduce a moving speed of the autonomous moving device.

In one embodiment thereof, a locating element is disposed on the wireless charging station, the wireless charging locating module includes a locating sensor for detecting the locating element, and when the locating sensor detects that the locating sensor and the locating element are in a preset location relationship, the wireless charging locating module determines that the autonomous moving device is at the charging location.

Further, the locating element is magnet, and the locating sensor is a magneto sensitive element.

In one embodiment thereof, the autonomous moving device and the wireless charging station are both provided with an electromagnet, or one of the autonomous moving device and the wireless charging station is provided with a permanent magnet; the wireless charging locating module is a magnetic force detection module, and the magnetic force detection module monitors intensity of a magnetic force between the autonomous moving device and the wireless charging station, and when the magnetic force is greater than a preset value, determines that the autonomous moving device is at the charging location.

In one embodiment thereof, the autonomous moving device further includes a receiving and processing circuit, and the receiving and processing circuit is in communication connection with the wireless charging receiving end and is configured to: detect the energy received by the wireless charging receiving end, and when detecting that the energy is greater than a first threshold, output a second electrical signal; otherwise, not output a second electrical signal; and the control module is in communication connection with the wireless charging receiving end and is in communication connection with the receiving and processing circuit, and the control module detects a first electrical signal of the charging receiving end, and is configured to: receive the second electrical signal, when detecting the first electrical signal but not receiving the second electrical signal, determine, by means of comparison, whether the first electrical signal is greater than a second threshold, and if the first electrical signal is greater than the second threshold and the second electrical signal is not detected within a time T, control the lawn mower to move in a direction distant from the wireless charging station, and then abut the wireless charging receiving end and the wireless charging transmitting end again.

Further, the second threshold is zero.

In one embodiment thereof, a shielder is disposed above the wireless charging receiving end, an area of the shielder is greater than that of the wireless charging transmitting end or the wireless charging receiving end.

In one embodiment thereof, the autonomous moving device wireless charging system further includes a wireless charging transfer apparatus, where the wireless charging transfer apparatus is disposed between the wireless charging transmitting end and the wireless charging receiving end, and is configured to receive a charging signal sent by the wireless charging transmitting end, and transmit the charging signal to the wireless charging receiving end.

Further, the wireless charging transfer apparatus is disposed on either of the wireless charging station and the autonomous moving device.

Further, when the autonomous moving device is located at the charging location, a distance between the wireless charging transmitting end and the wireless charging receiving end is greater than 5 centimeters.

Further, when the autonomous moving device is located at the charging location, an area of overlap between the wireless charging transmitting end and the wireless charging receiving end is less than 80% of an area of the wireless charging transmitting end or the wireless charging receiving end.

In one embodiment thereof, the autonomous moving device further includes a battery voltage detection module for detecting a voltage of the charging battery, and when the voltage of the charging battery is less than a preset value, the control module controls the driving module, to make the autonomous moving device return to the wireless charging station.

The present invention further provides an autonomous moving device. The autonomous moving device includes the autonomous moving device wireless charging system according to any one of the foregoing embodiments.

The present invention provides an autonomous moving device wireless charging apparatus, to resolve poor contact, electricity leakage, or the like during wired charging.

An autonomous moving device wireless charging apparatus is provided, where an autonomous moving device moves within an activity area, a wireless charging station is disposed within the activity area, the wireless charging station includes a wireless charging transmitting end, a signal line along which the wireless charging station can be located is disposed on the wireless charging station, and the wireless charging apparatus further includes:

a signal line search module disposed on the autonomous moving device, configured to: search for the signal line when the autonomous moving device needs to be charged, and direct the autonomous moving device to move along the signal line when finding the signal line;

a wireless charging locating module disposed on the autonomous moving device, configured to: locate a location of the wireless charging station when the autonomous moving device moves along the signal line, and when finding the location of the wireless charging station, direct the autonomous moving device to stop moving; and a wireless charging receiving module disposed on the autonomous moving device, configured to: when the wireless charging locating module locates the wireless charging station and directs the autonomous moving device to stop moving, receive a signal sent by the wireless charging transmitting end of the wireless charging station, and charge the autonomous moving device by using a charging circuit.

In one embodiment thereof, the wireless charging apparatus further includes:

a wireless locating module disposed on the autonomous moving device, configured to: determine the location of the wireless charging station, and direct the autonomous moving device to move towards the location of the wireless charging station.

In one embodiment thereof, the wireless locating module includes one of, or two or more of a GPS module, a Bluetooth module, or a Zigbee module.

In one embodiment thereof, the GPS module is a differential GPS module.

In one embodiment thereof, the signal line search module includes two signal line sensors distributed on two symmetric sides of the autonomous moving device, and when finding the signal line, the two signal line sensors adjust the autonomous moving device to make the signal line be longitudinally located at a central location of the autonomous moving device, and direct the autonomous moving device to move along the signal line.

In one embodiment thereof, by comparing values of received signal intensity of the signal line, the two signal line sensors adjust the autonomous moving device to make the signal line be longitudinally located at a central location of the autonomous moving device; or by making distances from the left and right wheels of the autonomous moving device to the signal line equal, the two signal line sensors adjust the autonomous moving device to make the signal line be longitudinally located at a central location of the autonomous moving device.

In one embodiment thereof, by making the left and right wheels of the autonomous moving device slowly rotate, the two signal line sensors make distances from the left and right wheels of the autonomous moving device to the signal line equal, or make signal intensity that is of the signal line and that is received by the two signal line sensors equal.

The wireless charging locating module includes a signal detection circuit. When the autonomous moving device moves along the signal line, the wireless charging transmitting end transmits a charging signal to the wireless charging receiving module, and the signal detection circuit detects whether a intensity value of the charging signal received by the wireless charging receiving module reaches a predetermined value, and when intensity of the detected charging signal reaches the predetermined value, find a location of the wireless charging station and direct the autonomous moving device to stop moving.

In one embodiment thereof, a charging signal transmitted by the wireless charging transmitting end to the wireless charging receiving module is a discontinuous charging signal. When the signal detection circuit detects whether a intensity value of the charging signal received by the wireless charging receiving module reaches a predetermined value, the signal detection circuit determines whether the intensity value of the charging signal reaches the predetermined value by detecting in real time whether a current or a voltage generated on a charging circuit by the charging signal received by the wireless charging receiving module reaches the predetermined value.

In one embodiment thereof, the wireless charging locating module includes a locating sensor, and the wireless charging station is pre-mounted with a locating element corresponding to the locating sensor. When the autonomous moving device moves along the signal line, the wireless charging locating module detects whether signal intensity between the locating sensor and the locating element reaches a predetermined value, and if the signal intensity reaches the predetermined value, finds a location of the wireless charging station and directs the autonomous moving device to stop moving.

In one embodiment thereof, the locating sensor is a Hall sensor, and correspondingly the locating element is magnet.

In one embodiment thereof, the wireless charging locating module further includes a sensor signal detection unit connected to the locating sensor, and when the autonomous moving device moves along the signal line, the wireless charging locating module detects, by using the sensor signal detection unit, whether signal intensity between the locating sensor and the locating element reaches a predetermined value.

The foregoing wireless charging apparatus of the autonomous moving device determines a wireless charging station by using a signal line, thereby wirelessly charging the autonomous moving device in an intelligent manner, and preventing an undesirable phenomenon such as pole piece oxidization or electricity leakage that may occur during conventional wired charging.

For the foregoing problem, it is necessary to provide a wireless charging system and a method thereof, which may be effectively applicable to charge a large device such as an autonomous lawn mower.

A wireless charging system is provided, including a transmitting apparatus and a receiving apparatus that is mounted on a moving device. The transmitting apparatus includes a transmitting end, the receiving apparatus includes a receiving end, a charging management apparatus connected to the receiving end, and a charging battery connected to the charging management apparatus. The receiving end and transmitting end are both provided with an electromagnet, or one of the receiving end and the transmitting end is provided with a permanent magnet. The charging management apparatus includes:

a charging detection module, configured to detect whether the charging battery needs to be charged;

an electrical connection module, configured to electrically connect the charging battery to the receiving end when the charging battery needs to be charged;

a magnetic force detection module, configured to detect a magnetic force value between the receiving end and the transmitting end; and a control module, configured to: control, according to a magnetic force value, the moving device to move towards the transmitting end, and align the receiving end with the transmitting end to charge the charging battery.

In the foregoing wireless charging system, the receiving end and transmitting end are both provided with an electromagnet, or one of the receiving end and the transmitting end is provided with a permanent magnet, and the two are aligned according to the magnetic force value, effectively facilitating wireless charging of the receiving end and the transmitting end. The wireless charging system is effectively applicable to a device such as an autonomous lawn mower.

In one embodiment thereof, the control module aligns the receiving end with the transmitting end when the magnetic force value is the maximum.

In one embodiment thereof, the charging management apparatus further includes:

an electrical disconnection module, configured to: when the receiving end and the transmitting end are aligned to charge the charging battery, if the charging detection module detects that a charging battery does not need to be charged, electrically disconnect the charging battery and the electromagnet that is disposed on the receiving end.

In one embodiment thereof, when detecting that a voltage of the charging battery is less than a preset minimum value, the charging detection module determines that the charging battery needs to be charged, and when detecting that the voltage of the charging battery is greater than or equal to a preset maximum value, the charging detection module determines that the charging battery does not need to be charged.

In one embodiment thereof, the wireless charging system further includes an identifying apparatus disposed on the moving device, configured to identify the transmitting end, so that a control module directs the moving device to move towards the transmitting end.

In one embodiment thereof, the identifying apparatus is a magnet, an infrared identifying module, or an image identifying module.

A wireless charging method is provided. Based on the foregoing wireless charging system, the method includes:

detecting whether a charging battery needs to be charged;

when the charging battery needs to be charged, electrically connecting the charging battery to a receiving end;

detecting a magnetic force value between the receiving end and a transmitting end; and controlling, according to the magnetic force value between the receiving end and the transmitting end, a moving device to move towards the transmitting end, and aligning the receiving end with the transmitting end to charge the charging battery.

According to the foregoing wireless charging method, the receiving end and transmitting end are both provided with an electromagnet, or one of the receiving end and the transmitting end is provided with a permanent magnet, and the two are aligned according to the magnetic force value, effectively facilitating wireless charging of the receiving end and the transmitting end. The wireless charging system is effectively applicable to a device such as an autonomous lawn mower.

In one embodiment thereof, the receiving end is aligned with the transmitting end when the magnetic force value is the maximum.

In one embodiment thereof, the method further includes:

when the receiving end and the transmitting end are aligned to charge the charging battery, if it is detected that the charging battery does not need to be charged, electrically disconnecting the charging battery and the electromagnet that is disposed on the receiving end.

Based on the foregoing problem, because an additional wireless communication sensor module needs to be added during application of autonomous moving device wireless charging, it is necessary to provide an autonomous moving device wireless charging apparatus and a wireless charging method.

An autonomous moving device wireless charging apparatus is provided, including:

a wireless charging transmitting apparatus, configured to send an electromagnetic signal;

a wireless charging receiving apparatus disposed on the autonomous moving device, configured to detect electromagnetic intensity of an electromagnetic signal of the wireless charging transmitting apparatus; and a control apparatus, connected to the wireless charging receiving apparatus, and configured to determine a distance between the wireless charging transmitting apparatus and the wireless charging receiving apparatus according to the electromagnetic intensity, and control a status of the autonomous moving device according to the distance.

According to an autonomous moving device wireless charging apparatus provided in the present invention, a wireless charging receiving apparatus detects electromagnetic intensity of an electromagnetic signal of a wireless charging transmitting apparatus, and a control apparatus determines a distance between the wireless charging transmitting apparatus and the wireless charging receiving apparatus according to the electromagnetic intensity, thereby controlling a status of an autonomous moving device according to the distance. For example, when the autonomous moving device does not need to be charged, the wireless charging transmitting apparatus is avoided. When the autonomous moving device needs to be charged, the autonomous moving device is made find accurately a location of the wireless charging transmitting apparatus for charging. A distance between the autonomous moving device and a charging station is prevented from being measured by using a wireless communication sensor module such as WiFi or Bluetooth, thereby reducing the product costs and increasing the price-performance ratio.

In one embodiment thereof, the wireless charging apparatus of the autonomous moving device further includes:

an identifying apparatus, configured to identify the wireless charging transmitting apparatus.

In one embodiment thereof, the wireless charging receiving apparatus is configured to: receive an electromagnetic signal and send the electromagnetic signal to the identifying apparatus, and when a pulse interval of the electromagnetic signal received by the wireless charging receiving apparatus is equal to a pulse interval of the electromagnetic signal sent by the wireless charging transmitting apparatus, identify the electromagnetic signal as the electromagnetic signal sent by the wireless charging transmitting apparatus.

In one embodiment thereof, the control apparatus is further configured to: when the autonomous moving device needs to be charged, control the autonomous moving device to move towards the wireless charging transmitting apparatus.

In one embodiment thereof, the wireless charging transmitting apparatus includes a transmitting coil, and the wireless charging receiving apparatus includes a receiving coil. The control apparatus determines a distance between the center of the receiving coil and the center of the transmitting coil according to the electromagnetic intensity, and control the autonomous moving device to move towards the transmitting coil.

In one embodiment thereof, the control apparatus is further configured to: when a distance between the wireless charging transmitting apparatus and the wireless charging receiving apparatus is less than or equal to a first preset threshold, the control apparatus controls the autonomous moving device to move slowly.

In one embodiment thereof, the control apparatus is further configured to: when a distance between the wireless charging transmitting apparatus and the wireless charging receiving apparatus is less than or equal to a second preset threshold, determine that the wireless charging receiving apparatus is aligned with the wireless charging transmitting apparatus and starts charging, so that the electromagnetic energy transmission efficiency between the wireless charging transmitting apparatus and the wireless charging receiving apparatus is the highest.

An autonomous moving device wireless charging method is provided, including steps:

transmitting, by a wireless charging transmitting apparatus, an electromagnetic signal;

receiving and detecting, by a wireless charging receiving apparatus, electromagnetic intensity of an electromagnetic signal transmitted by the wireless charging transmitting apparatus;

determining a distance between the wireless charging receiving apparatus and the wireless charging transmitting apparatus according to the electromagnetic intensity; and controlling a status of an autonomous moving device.

According to an autonomous moving device wireless charging method provided in the present embodiment, electromagnetic intensity of an electromagnetic signal of a wireless charging transmitting apparatus is detected, a distance between a wireless charging receiving apparatus and the wireless charging transmitting apparatus is determined according to the electromagnetic intensity, and a state of an autonomous moving device is controlled. For example, when the autonomous moving device does not need to be charged, the wireless charging transmitting apparatus is avoided. When the autonomous moving device needs to be charged, the autonomous moving device is made find accurately a location of the wireless charging transmitting apparatus for charging. A distance between the autonomous moving device and a charging station is prevented from being measured by using a wireless communication sensor module such as WiFi or Bluetooth, thereby reducing the product costs and increasing the price-performance ratio.

In one embodiment thereof, before the receiving and detecting, by a wireless charging receiving apparatus, electromagnetic intensity of an electromagnetic signal transmitted by the wireless charging transmitting apparatus, the method further includes the following step:

identifying the wireless charging transmitting apparatus.

In one embodiment thereof, the step of identifying the wireless charging transmitting apparatus includes:

transmitting, by the wireless charging transmitting apparatus, an electromagnetic signal, where a pulse interval of the electromagnetic signal is a time T; and receiving an electromagnetic signal, determining whether a pulse interval t of the received electromagnetic signal is equal to the pulse interval T of the electromagnetic signal sent by the wireless charging transmitting apparatus, and if yes, determining that the apparatus is the wireless charging transmitting apparatus; or if not, continuing to search for the wireless charging transmitting apparatus.

In one embodiment thereof, the step of determining a distance between the wireless charging receiving apparatus and the wireless charging transmitting apparatus according to the electromagnetic intensity includes:

detecting a peak value δA of the electromagnetic intensity; and determining a distance δr between the center of a receiving coil of the wireless charging receiving apparatus and the center of a transmitting coil of the wireless charging transmitting apparatus according to the δA.

In one embodiment thereof, the method further includes the following steps:

when the autonomous moving device needs to be charged, controlling the autonomous moving device to move towards a location at which the wireless charging transmitting apparatus is located.

In one embodiment thereof, the step of controlling the autonomous moving device to move towards a location at which the wireless charging transmitting apparatus is located includes:

when a distance between the wireless charging receiving apparatus and the wireless charging transmitting apparatus is less than or equal to a first preset threshold, slowly moving, by the autonomous moving device, towards the location at which the wireless charging transmitting apparatus is located.

In one embodiment thereof, when a distance between the wireless charging transmitting apparatus and the wireless charging receiving apparatus is less than or equal to a second preset threshold, it is determined that the wireless charging receiving apparatus is already aligned with the wireless charging transmitting apparatus and starts charging, so that the electromagnetic energy transmission efficiency between the wireless charging transmitting apparatus and the wireless charging receiving apparatus is the highest.

Based on this, it is necessary to provide a wireless docking and charging method and a system for a lawn mower for a problem of "when the lawn mower in the prior art returns to a charging station for charging, alignment of a charging receiving end of the lawn mower with a power supplying transmitting end of a charging station is problematic, and that the alignment cannot be implemented in time often occurs, causing the lawn mower to be unable to be charged in time, and affecting the next use".

This embodiment provides a lawn mower wireless docking and charging method, including: controlling a lawn mower to move towards a charging station, docking a charging receiving end of the lawn mower to a power supplying transmitting end of the charging station; detecting energy and a first electrical signal that are received by the charging receiving end; determining whether the detected energy is greater than or equal to a first threshold; if the detected energy is greater than or equal to the first threshold, outputting a second electrical signal; or if the detected energy is less than the first threshold, not outputting a second electrical signal; when the first electrical signal is detected but the second electrical signal is not received, determining, by means of comparison, whether the first electrical signal is greater than a second threshold; if the first electrical signal is greater than the second threshold and the second electrical signal is not detected within a time T, controlling the lawn mower to move distant from the charging station, and then docking the charging receiving end to the power supplying transmitting end again; and after the second electrical signal is received, controlling the lawn mower to start charging.

When the first electrical signal is detected but the second electrical signal is not received, if the first electrical signal is greater than the second threshold and the second electrical signal is not detected within the time T, the lawn mower is controlled to move distant from the charging station, for example, retreating, then the charging receiving end docks to the power supplying transmitting end again, until the second electrical signal is received, and the lawn mower is controlled to start charging. It is prevented that the lawn mower moves beyond the power supplying transmitting end or a driving path of the lawn mower deviates, causing that docking and charging fails.

In one embodiment thereof, the time T is zero.

In one embodiment thereof, the second threshold is zero.

Timing is started when the first electrical signal is detected, if the second electrical signal is not received after the time T, the charging receiving end docks to the power supplying transmitting end again, increasing the docking efficiency.

In one embodiment thereof, the method further includes: after the first electrical signal is detected, controlling the lawn mower to decelerate, when the second electrical signal is detected, controlling a speed of the lawn mower to decrease to zero.

The after the first electrical signal is detected, controlling the lawn mower to decelerate can effectively prevent that the charging receiving end is aligned with the power supplying transmitting end and then immediately the alignment fails due to an excessively high speed of the lawn mower, so that the charging receiving end and the power supplying transmitting end can be slowly and accurately aligned.

In one embodiment thereof, the first electrical signal is an output voltage or an output current of the charging receiving end.

In one embodiment thereof, the lawn mower stops moving when the lawn mower is controlled to start charging.

In one embodiment thereof, the charging receiving end is a receiving coil, the power supplying transmitting end is a transmitting coil, and the size and the shape of the receiving coil are respectively the same as the size and the shape of the transmitting coil.

Correspondingly, this embodiment further provides a lawn mower wireless docking and charging system, including: a charging receiving end, configured to: dock to a power supplying transmitting end of a charging station, receive energy of the power supplying transmitting end, and convert the energy into a first electrical signal; a receiving and processing circuit, in communication connection with the charging receiving end, and configured to: detect energy received by the charging receiving end, and when the detected energy is greater than a first threshold, determine that the charging receiving end and the power supplying transmitting end are aligned, output a second electrical signal, or otherwise, not output a second electrical signal; a control board, in communication connection with the charging receiving end and in communication connection with the receiving and processing circuit, configured to: control a lawn mower to move, and detect a first electrical signal of the charging receiving end, and configured to: receive the second electrical signal, when the first electrical signal is detected but the second electrical signal is not received, determine, by means of comparison, whether the first electrical signal is greater than a second threshold, and if the first electrical signal is greater than the second threshold and the second electrical signal is not detected within a time T, control the lawn mower to move distant from the charging station, and then dock the charging receiving end to the power supplying transmitting end again. After receiving the second electrical signal, the control board controls the lawn mower to start charging.

The control board is not only in communication connection with the receiving and processing circuit, but also in communication connection with the charging receiving end. Therefore, when the first electrical signal is received but the second electrical signal is not received, it may be determined, by means of comparison, whether the detected first electrical signal is greater than the second threshold, and if the first electrical signal is greater than the second threshold and the second electrical signal is not detected within the time T, the lawn mower is controlled to move distant from the charging station, and the charging receiving end docks to the power supplying transmitting end again. It is effectively prevented that the lawn mower moves beyond the power supplying transmitting end or a driving path of the lawn mower deviates, causing that docking and charging fails.

In one embodiment thereof, the time T is zero.

In one embodiment thereof, the second threshold is zero.

The control board further limit a time period from a time of detecting of the first electrical signal to a time of receiving of the second electrical signal, preventing that energy received by the charging receiving end is effective while it is difficult to satisfy a docking requirement due to a deviation of a docking path. The foregoing case may be discovered relatively early, and the charging receiving end docks to the power supplying transmitting end again, increasing the docking efficiency.

In one embodiment thereof, the control board is further configured to: after the first electrical signal is detected, control the lawn mower to decelerate, when the second electrical signal is received, control a speed of the lawn mower to decrease to zero.

After the first electrical signal is detected, the control board controls the lawn mower to decelerate, and this effectively prevents that the charging receiving end is aligned with the power supplying transmitting end and then immediately the alignment fails due to an excessively high speed of the lawn mower, so that the charging receiving end and the power supplying transmitting end can be slowly and accurately aligned, increasing the docking accuracy of the wireless docking and charging system.

In one embodiment thereof, the charging receiving end is a receiving coil, the power supplying transmitting end is a transmitting coil, and the size and the shape of the receiving coil are respectively the same as the size and the shape of the transmitting coil.

In one embodiment thereof, the receiving and processing circuit includes an A/D converter, a comparer in communication connection with the A/D converter, and a signal output unit in communication connection with the comparer.

When the detected energy of the charging receiving end is converted from an analog signal to a digital signal, subsequent comparison is easier. Therefore, the processing efficiency of the receiving and processing circuit is higher, and the second electrical signal may be relatively quickly output when the charging receiving end and the power supplying transmitting end are aligned.

It is necessary to provide an automatic self-propelling device wireless charging system for a magnetic leakage phenomenon of conventional wireless charging.

An automatic self-propelling device wireless charging system is provided. An automatic self-propelling device includes a shell. A battery is mounted in the shell. The battery is connected to a wireless charging receiving end configured to receive a signal transmitted by a wireless charging transmitting end and charge the battery, and a shielder whose area is greater than that of the wireless charging receiving end and the wireless charging transmitting end is disposed on the wireless charging receiving end.

In one embodiment thereof, the shielder is a round or square shielder.

In one embodiment thereof, two boundary line sensors for identifying a boundary line of the wireless charging station are further disposed in the shell of the automatic self-propelling device, and the two boundary line sensors are symmetrically disposed on two sides of the automatic self-propelling device.

In one embodiment thereof, a detection circuit configured to detect whether the wireless charging receiving end reaches an optimal charging status is further disposed in the shell, and the detection circuit is connected between the battery and the wireless charging receiving end.

In one embodiment thereof, the detection circuit includes a voltage detection circuit.

In one embodiment thereof, the detection circuit includes a current detection circuit.

In one embodiment thereof, the shielder is a shielder made of an MnZn power ferrite material.

In one embodiment thereof, the shielder is directly fastened in the shell.

In one embodiment thereof, the shielder is directly fastened in the shell by using a screw.

In one embodiment thereof, a central location of the shielder is aligned with a central location of the wireless charging receiving end.

According to the automatic self-propelling device wireless charging system, the size of an area of a shielder is set to be greater than an area of the wireless charging receiving end and the wireless charging transmitting end. When wireless charging is performed, if the wireless charging receiving end cannot receive all electromagnetic signals, the shielder can effectively filter out an electromagnetic signal, preventing a magnetic leakage phenomenon from occurring.

To resolve the foregoing problem that the receiving end cannot receive a charging signal because the receiving end and the transmitting end cannot be aligned, it is necessary to provide a wireless charging device that does not require the transmitting end and the receiving end to be aligned as much as possible.

An autonomous lawn mower wireless charging device is provided, including: a signal transmitting end, configured to transmit a charging signal; a signal receiving end, disposed on one end of an autonomous lawn mower, and configured to receive the charging signal of the signal transmitting end; a signal transfer apparatus, disposed between the signal transmitting end and the signal receiving end, and configured to: receive the charging signal transmitted by the signal transmitting end, and transmit the charging signal to the signal receiving end.

The wireless charging device may use a signal transfer apparatus to transfer the charging signal transmitted by the signal transmitting end. When the signal receiving end is close to the signal transfer apparatus, a charging effect can be achieved, without a need to dock the signal receiving end to the signal transmitting end. In this way, the charging effect can be achieved, without a need to align the transmitting end with the receiving end as much as possible.

In one embodiment thereof, the signal transfer apparatus is disposed on either of the signal transmitting end and the signal receiving end.

In one embodiment thereof, the signal transfer apparatus includes: a signal conversion unit, configured to receive a charging signal and transmit the charging signal to the signal receiving end.

In one embodiment thereof, by performing an electrical coupling action, the signal conversion unit generates an electric field from a varying magnetic field generated by the signal transmitting end, and then converts the electric field into a varying magnetic field. The magnetic field exchanges energy with the receiving end, implementing receiving a charging signal by the receiving end.

In one embodiment thereof, the signal transfer apparatus is electrically connected to the signal transmitting end.

In one embodiment thereof, the signal transfer apparatus is electrically connected to the signal receiving end.

In one embodiment thereof, the signal receiving end is located on a side surface of an autonomous lawn mower.

In one embodiment thereof, the wireless charging device further includes a battery and a power supply management module, the battery is electrically connected to the signal receiving end through the power supply management module, the power supply management module is configured to convert a charging signal into a current signal, and the battery is configured to store the current signal.

In one embodiment thereof, the charging signal transmitted by the signal transmitting end is an electromagnetic signal.

In one embodiment thereof, a location at which the signal receiving end receives the charging signal is more than 5 cm from the signal transmitting end.

In one embodiment thereof, an area of overlap between the signal receiving end and the signal transmitting end is less than 80% of an area of the signal receiving end or the signal transmitting end.

Figure 1:
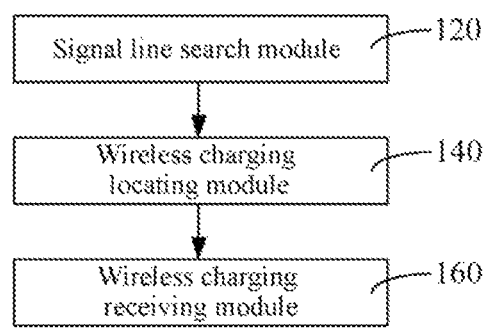
FIG. 1 is a structural diagram of an autonomous moving device wireless charging apparatus according to an embodiment.

110 Wireless locating module
120 Signal line search module
140 Wireless charging locating module
160 Wireless charging receiving module
1000 Autonomous lawn mower
1100 Controller
1200 Battery
1300 Wireless charging receiving end
1401 Signal line sensor
1402 Signal line sensor
1500 Wireless locating module
1600 Wireless charging management module
1700 Connection line
1801 Wireless charging transmitting end
1802 Ground
1803 Signal line
1901 Moving wheel
1902 Moving wheel
1903 Grass cutting head
1904 Moving motor driving module
1905 Grass cutting motor driving module
1906 Hall sensor
  110a Wireless charging transmitting end
  120a Wireless charging receiving end
  130a Charging management apparatus
  140a Charging battery
  150a Electromagnet
  151a Electromagnet
  160a Motor
  10 Wireless charging transmitting apparatus
  20 Wireless charging receiving apparatus
  30 Control apparatus
  40 Identifying apparatus
  12 Transmitting coil
  22 Receiving coil
  200 Autonomous lawn mower
  300 Charging station
  400 Boundary
  320 Transmitting coil
  220 Receiving coil
  210 First incline surface
  310 Second incline surface
  350 Docking area
  500 Charging receiving end
  510 Receiving and processing circuit
  520 Control board
    1 Wireless charging transmitting end
    2 Wireless charging receiving end
    3 Shielder
    4 Boundary line
  100b Wireless charging device
  110b Signal transmitting end
  120b Signal transfer apparatus
  130b Signal receiving end
  140b Power supply management module
  150b Battery
1907 magnet

DETAILED DESCRIPTION

To make the objectives, technical solutions, and advantages of the present invention clearer, the following further describes the present invention in detail with reference to the accompanying drawings and embodiments. It should be understood that, the specific embodiments described herein are merely used to explain the present invention, and are not intended to limit the present invention.

An robotic moving device, or referred to as an autonomous moving device, or an automatic self-propelling device, generally needs to move within an activity area. The activity area designates a range that the autonomous moving device may move, and correspondingly a wireless charging station that charges the autonomous moving device may be disposed in the activity area. The wireless charging station generally includes a wireless charging transmitting end. In this embodiment, a directing line along which the wireless charging station is located may be further disposed on the wireless charging station, for example, a signal line for transmitting an electromagnetic signal outwards, a graphic directing line, or a metal line. When being disposed, a signal line whose radius is approximately 1 meter or less may be disposed around the wireless charging station. The signal line may alternatively be a straight line that traverses the center of the wireless charging station. The signal line may be an electrical closed loop, or may be an open loop line similar to an antenna.

The autonomous moving device, or referred to as the autonomous moving device, includes a wireless charging receiving end, a charging battery, a wireless charging locating module, a driving module, and a control module. The wireless charging transmitting end wirelessly transmits a charging signal to the wireless charging receiving end to transmit electric energy. The charging battery is electrically connected to the wireless charging receiving end, to receive the electric energy transmitted from the wireless charging receiving end. The wireless charging locating module determines whether the autonomous moving device is at a charging location. In this embodiment, the wireless charging transmitting end and the wireless charging receiving end are aligned at the charging location. However, in another optional embodiment, the charging location is a range but not a determined point. Within the range, the wireless charging transmitting end and the wireless charging receiving end may not fully aligned, that is, there is a deviation, but charging can still be normally performed. Generally, an acceptable deviation range for magnetic resonance wireless charging is relatively large, and an acceptable deviation range for magnetic induction wireless charging is relatively small, and the wireless charging transmitting end and the wireless charging receiving end are even required to be exactly aligned. The driving module drives the autonomous moving device to move, and includes a movement component such as a wheel or a track, a driving motor, and the like. The control module is connected to the wireless charging locating module and driving module, and when the wireless charging locating module determines that the autonomous moving device is at the charging location, controls the driving module, to make the autonomous moving device dock at the charging location.

The autonomous moving device further includes a wireless charging station locating module, and the wireless charging station locating module locates a location of the wireless charging station, and sends the location of the wireless charging station to the control module; and the control module controls the driving module according to the location of the wireless charging station, to make the autonomous moving device move towards the wireless charging station.

In an embodiment, the wireless charging locating module determines a distance from the autonomous moving device to the charging location, and the control module controls the driving module according to the distance or a change of the distance, to make the autonomous moving device move towards the charging location. When the distance is decreased to a first preset distance, the control module controls the driving module, to reduce a moving speed of the autonomous moving device, thereby improving precision and a success rate of docking, and preventing the autonomous moving device from moving beyond the charging location due to inertia. The wireless charging locating module may determine the distance according to intensity of the charging signal or in another manner, which will be subsequently described in detail.

As shown in FIG. 1, an autonomous moving device wireless charging apparatus in an embodiment includes a wireless charging station locating module, a wireless charging locating module 140, and a wireless charging receiving module 160 that are disposed on an autonomous moving device.

In this embodiment, the wireless charging station locating module is a directing line search module, and more specifically, is a signal line search module 120, and is configured to: search for a signal line when the autonomous moving device needs to be charged, and direct the autonomous moving device to move along the signal line when finding the signal line. In this embodiment, the directing line search module is an electromagnetic signal sensor. In another optional embodiment, if the directing line is a graphic directing line, the directing line search module may be a camera. Alternatively, if the directing line is a metal line, the directing line search module may be a metal detector.

The wireless charging locating module 140 disposed on the autonomous moving device is configured to: locate a location of the wireless charging station when the autonomous moving device moves along the signal line, and when finding the location of the wireless charging station, direct the autonomous moving device to stop moving.

The wireless charging receiving module 160 disposed on the autonomous moving device is configured to: when the wireless charging locating module locates the wireless charging station and directs the autonomous moving device to stop moving, receive a signal sent by the wireless charging transmitting end of the wireless charging station, and charge the autonomous moving device by using a charging circuit. The wireless charging receiving module 160 includes a wireless charging receiving end and auxiliary charging and detection circuits.

When performing wireless charging, the autonomous moving device generally needs to satisfy a requirement on a location of the wireless charging. That is, a location between the wireless transmitting end of the wireless charging station and the wireless charging receiving module of the autonomous moving device needs to meet a charging condition. That is, when the autonomous moving device reaches the charging location, the optimal charging status can be achieved after the wireless charging transmitting end and the wireless charging receiving end are aligned. Therefore, in an embodiment, the signal line search module 120 includes two signal line sensors distributed on two symmetric sides of the autonomous moving device. When finding the signal line, the two signal line sensors adjust the autonomous moving device to make the signal line be longitudinally located at a central location of the autonomous moving device, and direct the autonomous moving device to move along the signal line. The signal line is a signal line that has been disposed, and moving along the signal line enables an optimal location for charging the autonomous moving device, so that the charging status is the best. Specifically, when adjusting the autonomous moving device to make the signal line be longitudinally located at a central location of the autonomous moving device, the two signal line sensors may compare values of received signal intensity of the signal line, to make the signal line be longitudinally located at the central location of the autonomous moving device. When the values of the signal intensity received by the two signal line sensors are different, the left and right wheels of the autonomous moving device may be adjusted to slightly rotate. For example, the left and right wheels move slowly to the left or right, and the autonomous moving device is slightly rotated to the left or right, so that the values of the signal intensity received by the two signal line sensors are equal. Alternatively, by making distances from the left and right wheels of the autonomous moving device to the signal line equal, the two signal line sensors may make the signal line be longitudinally located at the central location of the autonomous moving device. When the distances from the left and right wheels of the autonomous moving device to the signal line are not equal, the left and right wheels of the autonomous moving device may be adjusted to slightly rotate, to make the autonomous moving device slightly rotate to the left or right, so that the distances from the left and right wheels of the autonomous moving device to the signal line are equal. In another embodiment, a quantity of signal line sensors may vary. For example, there is only one signal line sensor. A distance from the signal line sensor to the signal line is monitored, so that the autonomous moving device is ensured to move along the signal line with an equidistance and reach the wireless charging station.

When finding the signal line and directing the autonomous moving device to move along the signal line, the signal line search module 120 needs to find accurately the location of the wireless charging station on the signal line. Therefore, in an embodiment, the wireless charging locating module 140 may include a charging signal detection module, and the charging signal detection module includes a signal detection circuit. When the autonomous moving device moves along the signal line, the wireless charging transmitting end transmits a charging signal to the wireless charging receiving module, and the signal detection circuit detects whether intensity of the charging signal received by the wireless charging receiving module reaches a predetermined value, and when the intensity of the detected charging signal reaches the predetermined value, finds the location of the wireless charging station and directs the autonomous moving device to stop moving. A charging signal transmitted by the wireless charging transmitting end to the wireless charging receiving module may be a discontinuous charging signal, and is a tentative charging signal. The signal detection circuit determines, by detecting in real time whether a current or a voltage generated on a charging circuit by the charging signal received by the wireless charging receiving module reaches the predetermined value, whether the intensity of the charging signal reaches the predetermined value. When the current or the voltage generated on the charging circuit by the charging signal reaches the predetermined value, it may be determined that the intensity of the charging signal reaches the predetermined value, and it indicates that the location of the wireless charging station has been found. It is determined that the autonomous moving device is located at the charging location, and the autonomous moving device may stop moving to perform charging. An optimal status, including the voltage or the current that reaches the predetermined value, may be preset when wireless charging is performed on the autonomous moving device. This usually indicates that the requirement on the location of the wireless charging is already met. That is, a location relationship between the wireless transmitting end of the wireless charging station and the wireless charging receiving module 160 of the autonomous moving device may reach the optimal charging status. When the signal detection circuit detects that there is a current or a voltage signal on the charging circuit, it indicates that the wireless charging receiving module may already receive a charging signal, and it also indicates that the autonomous moving device is already relatively close to the wireless charging station. In this case, a moving speed of the autonomous moving device may be immediately reduced, so that the autonomous moving device moves along the signal line at a relatively low speed, until the signal detection circuit detects that the voltage or the current on the charging circuit reaches the predetermined value, and then the autonomous moving device immediately stops moving.

Only when the charging signal received by the wireless charging receiving end exceeds specific intensity, the charging circuit has a charge voltage and a charge current, and an induced voltage is generated on the wireless charging receiving end as long as the wireless charging receiving end is close to the wireless charging transmitting end. Therefore, in an embodiment, the signal detection circuit directly detects the induced voltage on the wireless charging receiving end to determine the intensity of the charging signal. A manner of detecting the induced voltage may be detecting the induced voltage itself or detecting the induced current. An advantage of this embodiment is that a detection range is wider, and a moving device may determine that it is near the wireless charging station even when it is more distant from the charging location, thereby taking measures such as deceleration. In addition, it can be prevented that the autonomous moving device directly moves beyond the charging location because a moving direction is relatively deviated, and there is no charge current or charge voltage on the charging circuit.

In another embodiment, the wireless charging locating module 140 may further include a locating sensor. The wireless charging station is pre-mounted with a locating element. When the autonomous moving device moves along the signal line, the wireless charging locating module 140 detects whether the locating sensor and the locating element are in a predetermined location relationship. When the locating sensor detects that the locating sensor is in the predetermined location relationship with the locating element, the wireless charging locating module determines that the autonomous moving device is at the charging location.

Specifically, the wireless charging locating module determines whether the signal intensity detected by the locating sensor reaches a predetermined value, and if the signal intensity reaches a predetermined value, finds the location of the wireless charging station, and determines that the autonomous moving device is at the charging location and directs the autonomous moving device to stop moving. The locating element pre-mounted in the wireless charging station may indicate the specific location of the wireless charging station. When a signal between the locating sensor and the locating element reaches the predetermined value (generally, a predetermined value that is set is a maximum value that can be generated when the autonomous moving device moves along the signal line), it indicates that the autonomous moving device and the wireless charging station have already reached the optimal charging location. In this case, the autonomous moving device may be directed into the optimal charging status. The locating sensor may be a Hall sensor, or may be another magneto sensitive element, for example, another sensor such as a magnetic resistor. The locating element may be magnet that is correspondingly disposed below the wireless charging station, and it will do when a signal generated by the locating sensor and the magnet reaches the predetermined value. The wireless charging locating module 140 may further include a sensor signal detection unit connected to the locating sensor, and when the autonomous moving device moves along the signal line, the wireless charging locating module 140 detects, by using the sensor signal detection unit, whether signal intensity between the locating sensor and the locating element reaches a predetermined value. Specifically, when the sensor signal detection unit detects that there is a signal from the locating sensor, it indicates that the autonomous moving device and the wireless charging station are already relatively close to each other. In this case, a moving speed of the autonomous moving device may be immediately reduced, so that the autonomous moving device moves along the signal line at a relatively low speed, until the signal intensity detected by the sensor signal detection unit reaches a predetermined value, and then the autonomous moving device stops moving.

The foregoing wireless charging apparatus of the autonomous moving device locates a wireless charging station by using a signal line, thereby wirelessly charging the autonomous moving device in an intelligent manner, and preventing an undesirable phenomenon such as pole piece oxidization or electricity leakage that may occur during conventional wired charging.

Figure 2:
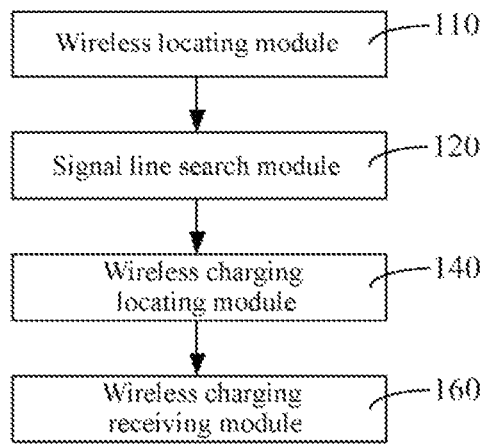
FIG. 2 is a structural diagram of an autonomous moving device wireless charging apparatus according to another embodiment.

As shown in FIG. 2, an autonomous moving device wireless charging apparatus further includes a wireless locating module 110 disposed on an autonomous moving device. Both the wireless locating module 110 and a signal line search module 120 belong to a wireless charging station locating module, and a difference lies in that, the wireless locating module 110 in this embodiment is configured to roughly locate an approximate location of a wireless charging station. In an optional embodiment, the wireless locating module 110 can independently locate the wireless charging station, without needing the signal line search module 120. In these embodiments, the wireless locating module 110 is preferably a high-precision locating module, and can perform locating to meter level, decimeter level, or even centimeter level.

The wireless locating module 110 disposed on the autonomous moving device is configured to: determine the approximate location of the wireless charging station, and direct the autonomous moving device to move towards the approximate location of the wireless charging station. Generally, the autonomous moving device may be distant from the wireless charging station, and the location of the wireless charging station may be roughly located by using the wireless locating module 110, thereby directing the autonomous moving device to move towards the approximate location of the wireless charging station. When the autonomous moving device moves to the signal line or a location relatively close to the signal line, the signal line search module 120 may find the corresponding signal line. The wireless locating module may be one or more of a GPS module, a Bluetooth module, a Zigbee module, or a WiFi module, as long as the wireless charging station may be roughly located. For example, the wireless locating module may be a Bluetooth 5.0 module, or a combination of the Bluetooth module and the WiFi module. The GPS module may alternatively be a differential GPS module, or referred to as a DGPS module. Locating precision of the differential GPS module can reach centimeter level. Therefore, by independently using the differential GPS module, the autonomous moving device may be directly directed to the wireless charging station for charging.

During specific implementation, the foregoing autonomous moving device wireless charging apparatus may be implemented in at least four manners, specifically including:

Manner 1: The autonomous moving device wireless charging apparatus may use only the differential GPS module. Location precision of the differential GPS module can reach centimeter level. Therefore, by independently using the differential GPS module, the autonomous moving device may be directly directed to the wireless charging station, and the autonomous moving device may be charged by using the wireless charging receiving module 160. The autonomous moving device in this manner may not have the signal line search module.

Manner 2: The autonomous moving device wireless charging apparatus may roughly locate the location of the wireless charging station by using the wireless locating module 110, and when the autonomous moving device reaches the signal line or is relatively close to the signal line, the signal line search module 120 may find the signal line. The signal detection circuit of the wireless charging locating module 140 detects whether a current or a voltage of a charging circuit of the wireless charging receiving module 160 reaches a predetermined value, thereby finding the specific location of the wireless charging station, and charging the autonomous moving device by using the wireless charging receiving module 160.

Manner 3: The autonomous moving device wireless charging apparatus may directly find the signal line by using the signal line search module 120. When the autonomous moving device moves along the signal line, the sensor signal detection unit of the wireless charging locating module 140 detects whether signal intensity between a locating sensor of the wireless charging locating module 140 and a locating piece pre-mounted in the wireless charging station reaches a predetermined value, thereby finding the specific location of the wireless charging station, and charging the autonomous moving device by using the wireless charging receiving module 160.

Manner 4: The autonomous moving device wireless charging apparatus may directly find the signal line by using the signal line search module 120, and the wireless charging locating module 140 may find the specific location of the wireless charging station. The signal detection circuit of the wireless charging locating module 140 detects whether a current or a voltage of the charging circuit of the wireless charging receiving module 160 reaches a predetermined value, thereby finding the specific location of the wireless charging station, and charging the autonomous moving device by using the wireless charging receiving module 160.

The objectives of the present invention may be achieved by using any one of the foregoing four combinations. The technical features in the foregoing embodiments may form any combination. To make the descriptions concise, not all possible combinations of the technical features in the foregoing embodiments are described. However, as long as there is no contradiction in these combinations of the technical features, the combinations should be considered as within a recording scope of this specification.

In the following embodiment, the present invention is further described by selecting one type of autonomous moving device. In the present invention, the foregoing four manners are specifically described by selecting an autonomous lawn mower as a specifically described object.

For the manner 1, the autonomous lawn mower may be accurately charged as long as the differential GPS is mounted on the autonomous lawn mower.

Figure 3:
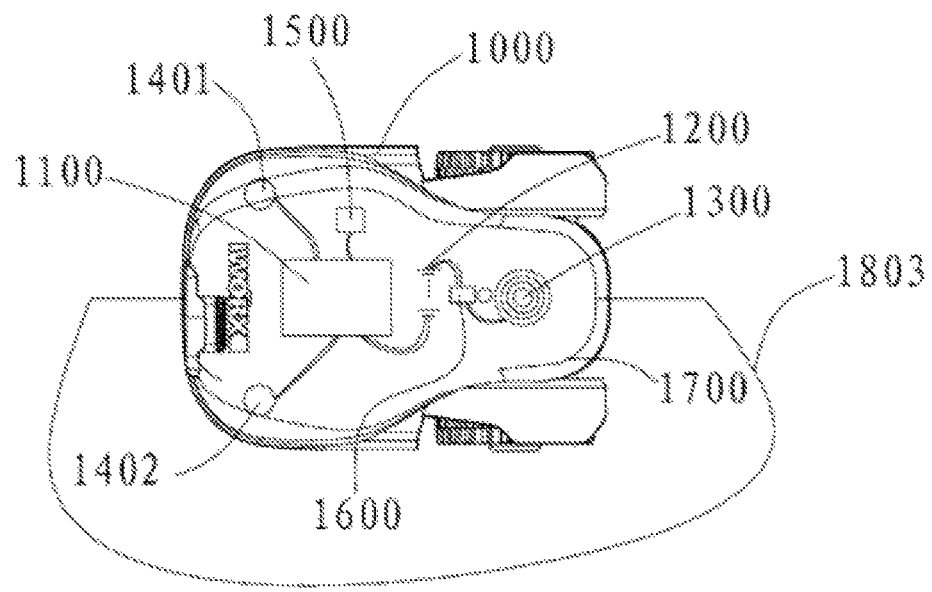
FIG. 3 is a top view of an autonomous lawn mower during charging in a manner in an autonomous moving device wireless charging apparatus.
Figure 4:
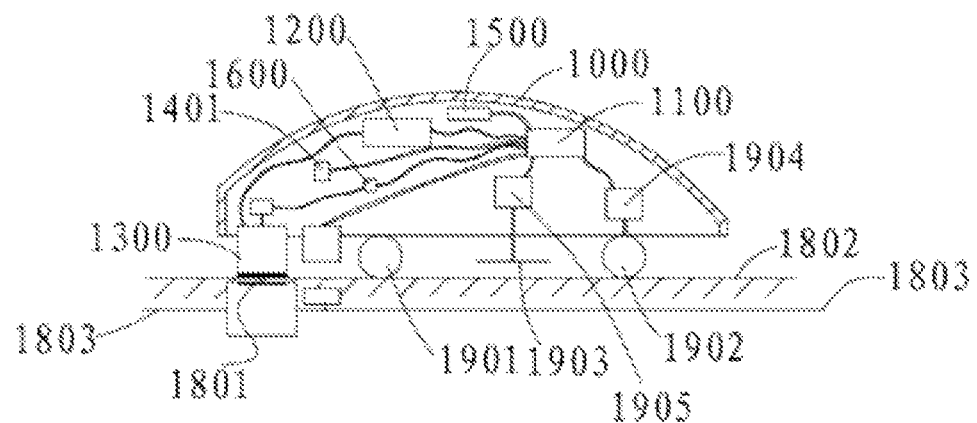
FIG. 4 is a sectional diagram of the autonomous lawn mower corresponding to FIG. 3.

For the manner 2, as shown in FIG. 3 and FIG. 4, an autonomous lawn mower 1000 includes an autonomous lawn mower controller 1100, a battery 1200 connected to the autonomous lawn mower controller 1100, a wireless charging receiving end 1300 connected to the battery 1200 and a corresponding circuit, a wireless charging management module 1600 connected to the wireless charging receiving end 1300, two signal line sensors 1401 and 1402 that are on the left and right and that are connected to the controller 1100, a wireless locating module 1500 connected to the controller 1100, an internal connection line 1700 in the lawn mower, and the like. The autonomous lawn mower 1000 further includes moving wheels 1901 and 1902, a grass cutting head 1903, a moving motor driving module 1904, a grass cutting motor driving module 1905, and the like. The wireless charging receiving end 1300, the battery 1200, the lawn mower controller 1100, a grass cutting motor, a moving motor, and the like in the lawn mower may be connected to each other by using a conductive wire. The wireless locating module 1500 may be the GPS, the Bluetooth, or the like. The wireless charging management module 1600 may detect a current or a voltage of a charging circuit generated by the wireless charging receiving end 1300.

A wireless charging station includes a wireless charging transmitting end 1801. The wireless charging transmitting end 1801 may be buried under a ground 1802 or slightly protruding from the ground 1802. A signal line 1803 is disposed in the wireless charging station.

When needing to be charged, the autonomous lawn mower 1000 may use the wireless locating module 1500 to roughly locate a location of the wireless charging station and direct the lawn mower 1000 to move towards the location of the wireless charging station. When the lawn mower 1000 reaches the signal line 1803 or is relatively close to the signal line 1803, the two signal line sensors 1401 and 1402 that are on the left and right and that are connected to the controller 1100 may find the signal line 1803, and make the signal line 1803 be longitudinally located at a central location of the lawn mower 1000. When the lawn mower 1000 moves along the signal line 1803, the wireless charging management module 1600 detects whether there is a current or a voltage signal in a charging circuit generated by the wireless charging receiving end 1300, and reduces a moving speed of the lawn mower when detecting that there is the signal. When detecting that the current or the voltage of the charging circuit generated by the wireless charging receiving end 1300 reaches a predetermined value, the wireless charging management module 1600 finds a specific location of the wireless charging station, the wireless charging receiving end 1300 may receive a signal sent by the wireless charging transmitting end 1801, and charge the lawn mower.

Figure 5:
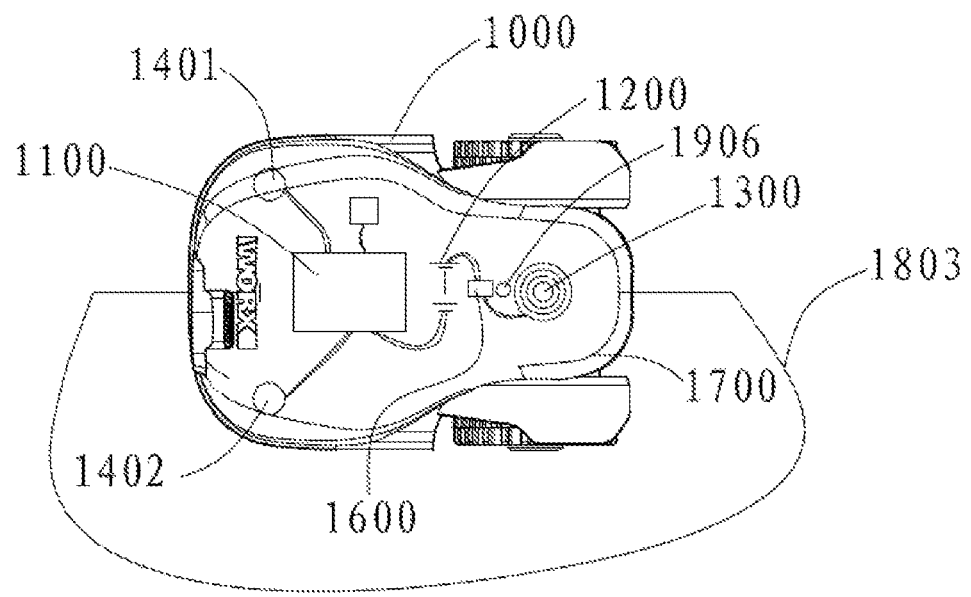
FIG. 5 is a top view of an autonomous lawn mower during charging in another manner in an autonomous moving device wireless charging apparatus.
Figure 6:
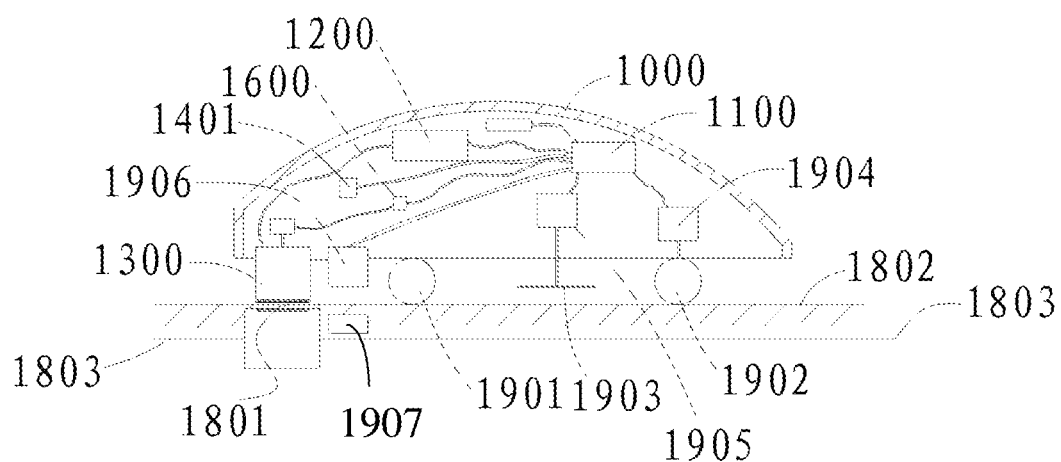
FIG. 6 is a sectional diagram of the autonomous lawn mower corresponding to FIG. 5.

For the manner 3, as shown in FIG. 5 and FIG. 6, an autonomous lawn mower 1000 includes an autonomous lawn mower controller 1100, a battery 1200 connected to the autonomous lawn mower controller 1100, a wireless charging receiving end 1300 connected to the battery 1200 and a corresponding circuit, a wireless charging management module 1600 connected to the wireless charging receiving end 1300, two signal line sensors 1401 and 1402 that are on the left and right and that are connected to the controller 1100, an internal connection line 1700 in the lawn mower, and the like. The autonomous lawn mower 1000 further includes moving wheels 1901 and 1902, a grass cutting head 1903, a moving motor driving module 1904, a grass cutting motor driving module 1905, a Hall sensor 1906, a sensor signal detection unit that detects signal intensity of the Hall sensor 1906, and the like. The wireless charging receiving end 1300, the battery 1200, the lawn mower controller 1100, a grass cutting motor, a moving motor, and the like in the lawn mower may be connected to each other by using a conductive wire.

A wireless charging station includes a wireless charging transmitting end 1801. The wireless charging transmitting end 1801 may be buried under a ground 1802 or slightly protruding from the ground 1802. A signal line 1803 and magnet 1907 are disposed on the wireless charging station.

When the autonomous lawn mower needs to be charged, the two signal line sensors 1401 and 1402 that are on the left and right and that are connected to the controller 1100 may find the signal line 1803, and make the signal line 1803 be longitudinally located at the central location of the lawn mower 1000. The sensor signal detection unit detects whether there is intensity signal between the Hall sensor 1906 and the magnet 1907, and reduces the moving speed of the lawn mower when there is intensity signal. When detecting that the signal intensity between the Hall sensor 1906 and the magnet 1907 reaches a predetermined value, the sensor signal detection unit finds the specific location of the wireless charging station, and may use the wireless charging receiving end 1300 to receive a signal sent by the wireless charging transmitting end 1801, to charge the lawn mower.

Figure 7:
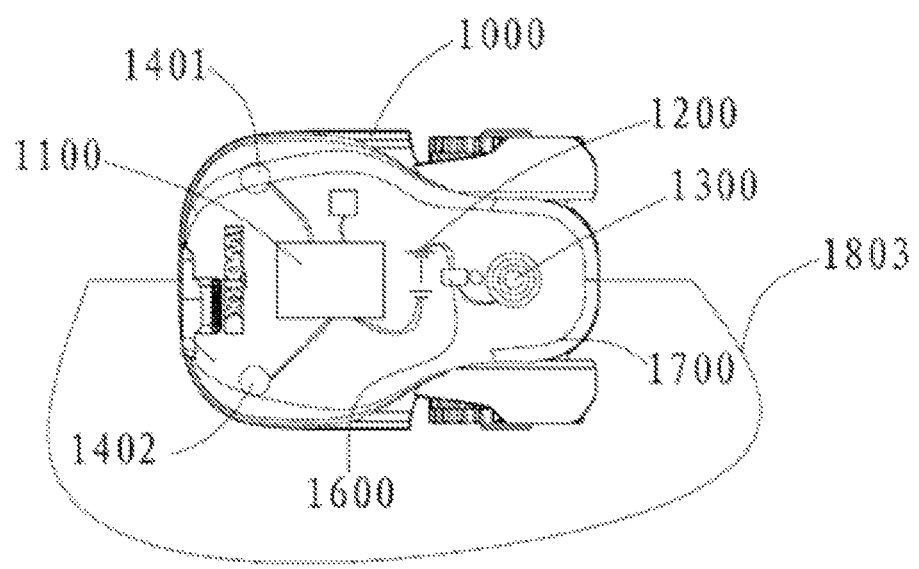
FIG. 7 is a top view of an autonomous lawn mower during charging in still another manner in an autonomous moving device wireless charging apparatus.
Figure 8:
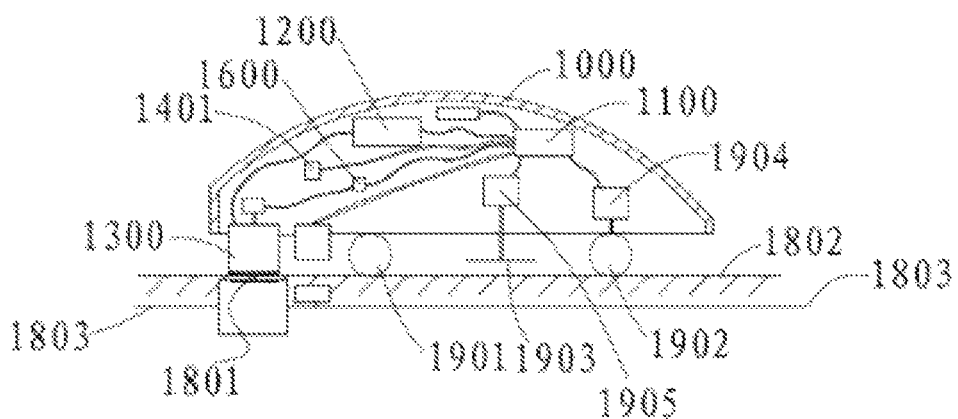
FIG. 8 is a sectional diagram of the autonomous lawn mower corresponding to FIG. 7.

For the manner 4, as shown in FIG. 7 and FIG. 8, an autonomous lawn mower 1000 includes an autonomous lawn mower controller 1100, a battery 1200 connected to the autonomous lawn mower controller 1100, a wireless charging receiving end 1300 connected to the battery 1200 and a corresponding circuit, a wireless charging management module 1600 connected to the wireless charging receiving end 1300, two signal line sensors 1401 and 1402 that are on the left and right and that are connected to the controller 1100, an internal connection line 1700 in the lawn mower, and the like. The autonomous lawn mower 1000 further includes moving wheels 1901 and 1902, a grass cutting head 1903, a moving motor driving module 1904, a grass cutting motor driving module 1905, and the like. The wireless charging receiving end 1300, the battery 1200, the lawn mower controller 1100, a grass cutting motor, a moving motor, and the like in the lawn mower may be connected to each other by using a conductive wire. The wireless charging management module 1600 may detect a current or a voltage of a charging circuit generated by the wireless charging receiving end 1300.

A wireless charging station includes a wireless charging transmitting end 1801. The wireless charging transmitting end 1801 may be buried under a ground 1802 or slightly protruding from the ground 1802. A signal line 1803 is disposed in the wireless charging station.

When the autonomous lawn mower needs to be charged, the two signal line sensors 1401 and 1402 that are on the left and right and that are connected to the controller 1100 may find the signal line 1803, and make the signal line 1803 be longitudinally located at the central location of the lawn mower 1000. When the lawn mower 1000 moves along the signal line 1803, the wireless charging management module 1600 detects whether there is a current or a voltage signal in a charging circuit generated by the wireless charging receiving end 1300, and reduces a moving speed of the lawn mower when detecting that there is the signal. When detecting that the current or the voltage of the charging circuit generated by the wireless charging receiving end 1300 reaches a predetermined value, the wireless charging management module 1600 finds the specific location of the wireless charging station, the wireless charging receiving end 1300 may receive a signal sent by the wireless charging transmitting end 1801, and charge the lawn mower.

The following describes another embodiment of the present invention with reference to FIG. 9 to FIG. 12.

In this embodiment, electromagnets are respectively disposed on an autonomous moving device and a wireless charging station, or a permanent magnet is disposed on either of the autonomous moving device and the wireless charging station. A wireless charging locating module is a magnetic force detection module, and the magnetic force detection module monitors intensity of a magnetic force between the autonomous moving device and the wireless charging station, and when the magnetic force is greater than a preset value, determines that the autonomous moving device is at a charging location.

Figure 9:
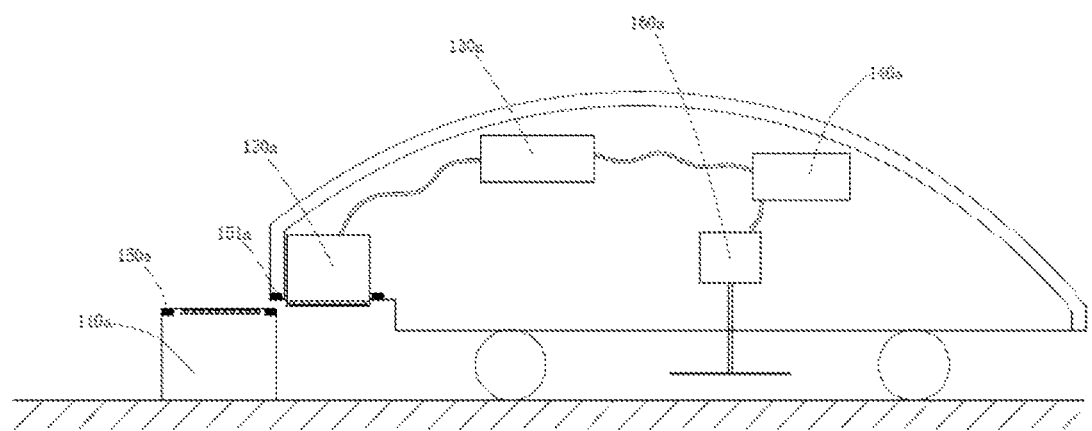
FIG. 9 is a schematic diagram of a wireless charging system according to an embodiment.

Specifically, as shown in FIG. 9, in this embodiment a wireless charging system includes a transmitting apparatus and a receiving apparatus mounted on an autonomous moving device. The transmitting apparatus includes a wireless charging transmitting end 110*a*, and the receiving apparatus includes a wireless charging receiving end 120*a*, a charging management apparatus 130*a* connected to the wireless charging receiving end 120*a*, and a charging battery 140*a* connected to the charging management apparatus 130*a*. The wireless charging receiving end 120*a* and the wireless charging transmitting end 110*a* are both provided with an electromagnet, or one of the wireless charging receiving end and the wireless charging transmitting end is provided with a permanent magnet. The charging management apparatus 130 includes:

a charging detection module, configured to detect whether the charging battery needs to be charged;

an electrical connection module, configured to electrically connect the charging battery to the receiving end when the charging battery needs to be charged;

a magnetic force detection module, configured to detect a magnetic force value between the wireless charging receiving end and the wireless charging transmitting end; and a control module, configured to: control, according to the magnetic force value between the wireless charging receiving end and the wireless charging transmitting end, the autonomous moving device to move towards the transmitting end, and align the receiving end with the transmitting end to charge the charging battery.

In the foregoing wireless charging system, the wireless charging receiving end and the wireless charging transmitting end are both provided with an electromagnet, or one of the wireless charging receiving end and the wireless charging transmitting end is provided with a permanent magnet, and the two are aligned according to the magnetic force value, effectively facilitating wireless charging of the receiving end and the transmitting end. The wireless charging system is effectively applicable to a moving device such as an autonomous lawn mower.

For application to the autonomous lawn mower, generally the autonomous lawn mower works within a boundary line, and a charging station is disposed on the boundary line. Therefore, the transmitting apparatus may be mounted on the charging station, and the transmitting end may be directly connected to the charging station, facilitating power supplying. The charging battery in the autonomous lawn mower may alternatively be directly connected to a motor 160, and the motor 160 drives a blade to cut grass. In this case, the charging station is a wireless charging station. In another embodiment, a work environment of the autonomous lawn mower may alternatively not have the boundary line, and the autonomous lawn mower determines a work range by using a visual identification technology or a high precision location technology.

Figure 10:
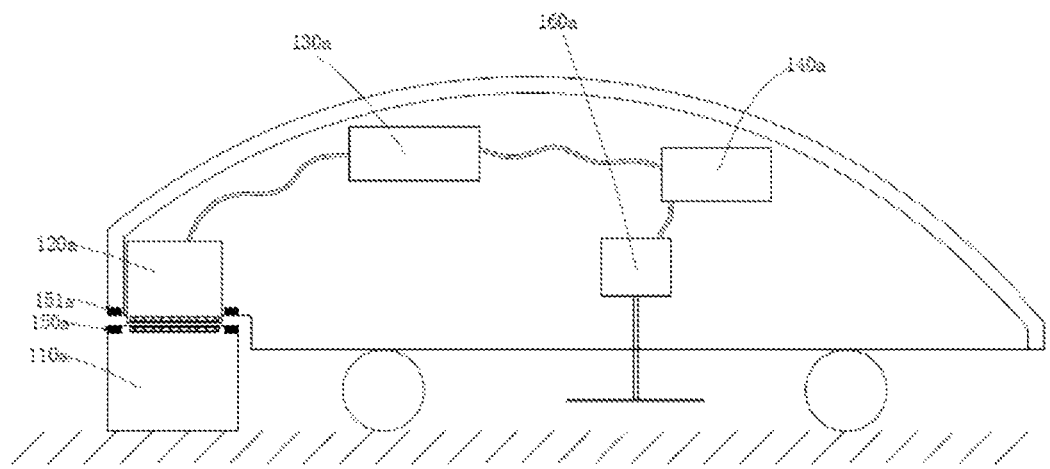
FIG. 10 is a schematic diagram of a wireless charging system during charging after being aligned according to an embodiment.

The control module aligns the receiving end with the transmitting end when the magnetic force value is the maximum. When the receiving end is aligned with the transmitting end, if the electromagnet of the receiving end does not move to right above the electromagnet of the transmitting end, the magnetic force between the two does not reach the maximum. However, when the magnetic force reaches the maximum, it indicates that the electromagnet of the receiving end happens to move to right above the electromagnet of the transmitting end. In this case, it indicates that the receiving end is aligned with the transmitting end, and wireless charging may be started. As shown in FIG. 10, FIG. 10 is a schematic diagram when the receiving end and the transmitting end are aligned for charging.

The charging management apparatus further includes:
an electrical disconnection module, configured to: when the receiving end and the transmitting end are aligned to charge the charging battery, if the charging detection module detects that a charging battery does not need to be charged, electrically disconnect the charging battery and the electromagnet that is disposed on the receiving end. When the two is electrically disconnected, there is no magnetic force between the electromagnet of the receiving end and the electromagnet of the transmitting end, and the two may be separated, to stop charging. The moving device may start working after the charging stops.

When detecting whether the charging battery needs to be charged, the charge detection module may detect a current or a voltage of the charging battery. To facilitate detection, in this embodiment, whether charging is needed is detected by using a manner of detecting the voltage thereof. When detecting that a voltage of the charging battery is less than a preset minimum value, the charging detection module determines that the charging battery needs to be charged, and when detecting that the voltage of the charging battery is greater than or equal to a preset maximum value, the charging detection module determines that the charging battery does not need to be charged. The preset minimum value may be a minimum voltage value that allows the moving device to return to the transmitting end, and the preset maximum value may be a factory value of the charging battery or another value that is artificially set.

For the foregoing wireless charging system, when the receiving end is relatively close to the transmitting end, the electromagnets of the two may be aligned under the influence of a magnetic force (including a direction and a value) to enable charging. However, when the two is relatively distant from each other, the magnetic force between the two is relatively weak, and the corresponding transmitting end cannot be found. Therefore, the wireless charging system further includes an identifying apparatus disposed in the moving device, to identify the transmitting end to make the control module direct the moving device to move towards the transmitting end. The identifying apparatus may be a specific device such as a signal line, a GPS/DGPS/infrared identifying module, or a graphic identifying module, as long as the transmitting end can be identified.

Figure 11:
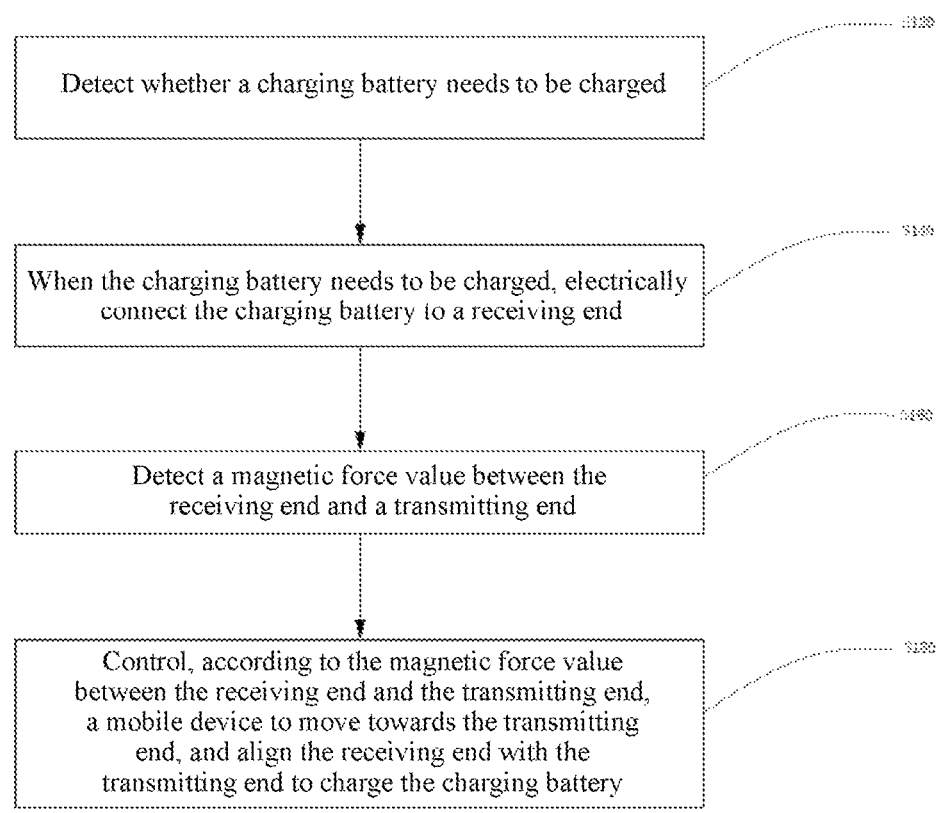
FIG. 11 is a flowchart of a wireless charging method according to an embodiment.

As shown in FIG. 11, based on the foregoing wireless charging system, a wireless charging method in an embodiment includes step S120 to step S180.

Step S120: Detect whether a charging battery needs to be charged.

Step S140: When the charging battery needs to be charged, electrically connect the charging battery to a receiving end.

Step S160: Detect a magnetic force value between the receiving end and a transmitting end.

Step S180: Control, according to the magnetic force value between the receiving end and the transmitting end, a moving device to move towards the transmitting end, and align the receiving end with the transmitting end to charge the charging battery.

According to the foregoing wireless charging method, the wireless charging receiving end and the wireless charging transmitting end are both provided with an electromagnet, or one of the wireless charging receiving end and the wireless charging transmitting end is provided with a permanent magnet, and the two are aligned according to the magnetic force value, effectively facilitating wireless charging of the receiving end and the transmitting end. The wireless charging system is effectively applicable to a device such as an autonomous lawn mower.

In step S180, the receiving end is aligned with the transmitting end when the magnetic force value is the maximum. When the receiving end is aligned with the transmitting end, if an electromagnet of the receiving end does not move to right above an electromagnet of the transmitting end, a magnetic force between the two does not reach the maximum. However, when the magnetic force reaches the maximum, it indicates that the electromagnet of the receiving end happens to move to right above the electromagnet of the transmitting end. In this case, it indicates that the receiving end is aligned with the transmitting end, and wireless charging may be started.

Figure 12:
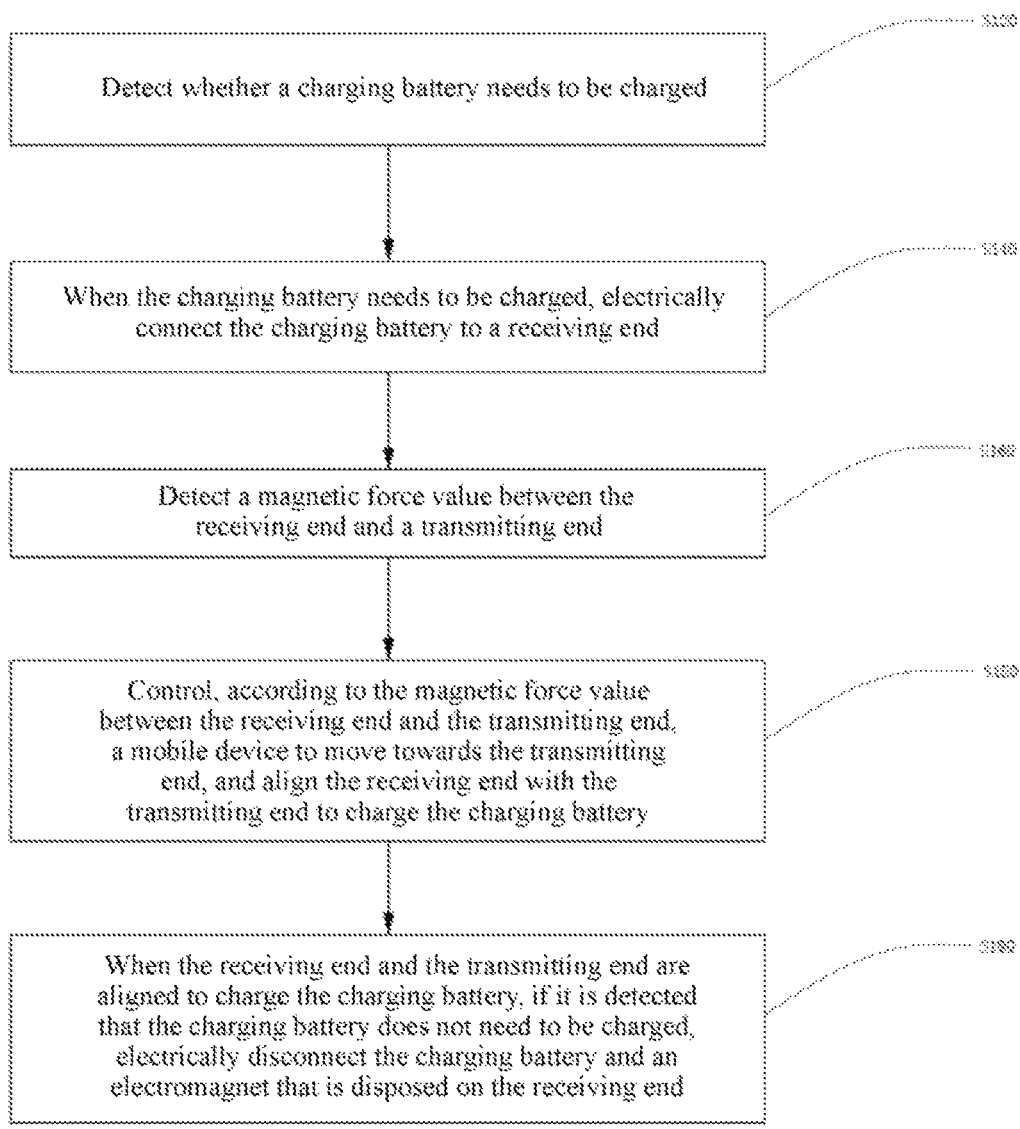
FIG. 12 is a flowchart of a wireless charging method according to another embodiment.

As shown in FIG. 12, a wireless charging method in another embodiment further includes step S190.

Step S190: When the receiving end and the transmitting end are aligned to charge the charging battery, if it is detected that the charging battery does not need to be charged, electrically disconnect the charging battery and the electromagnet that is disposed on the receiving end.

Figure 13:
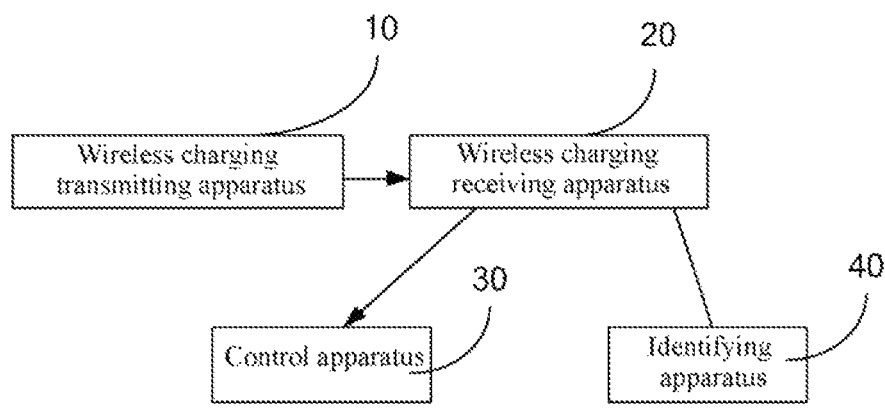
FIG. 13 is a block diagram of hardware of an autonomous moving device wireless charging apparatus according to an embodiment of the present invention.
Figure 14:
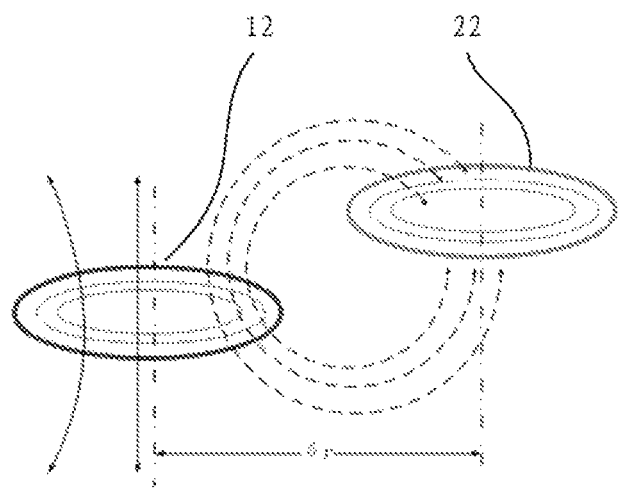
FIG. 14 is a diagram of a charging principle of an autonomous moving device wireless charging apparatus according to an embodiment of the present invention.
Figure 15:
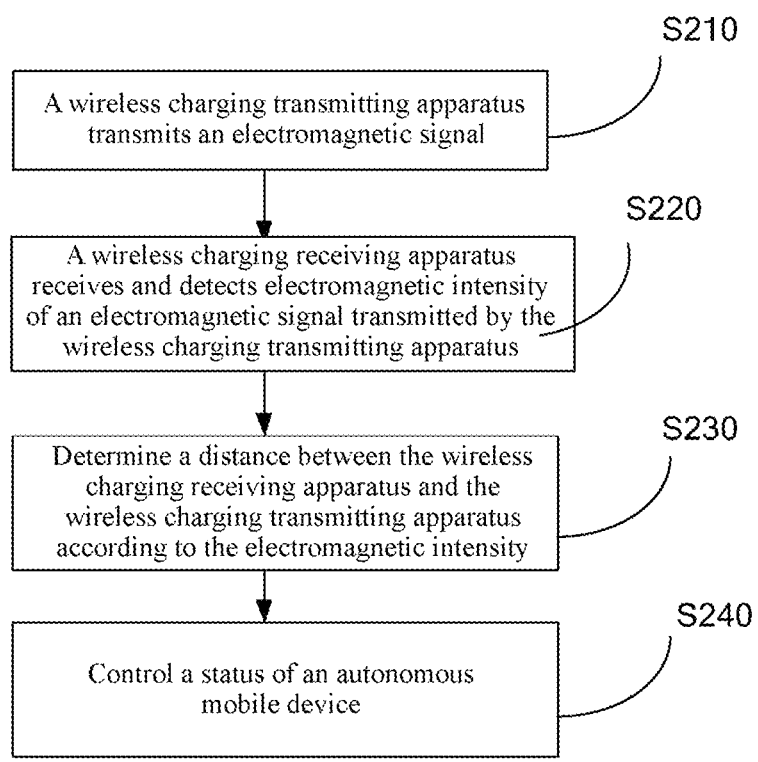
FIG. 15 is a flowchart of an autonomous moving device wireless charging method according to an embodiment of the present invention.

The following describes another embodiment of the present invention with reference to FIG. 13 to FIG. 15.

Referring to FIG. 13, an embodiment of the present invention provides an autonomous moving device wireless charging apparatus, including:
a wireless charging transmitting apparatus 10, configured to send an electromagnetic signal;
a wireless charging receiving apparatus 20 disposed on the autonomous moving device, configured to detect electromagnetic intensity of the electromagnetic signal of the wireless charging transmitting apparatus 10; and
a control apparatus 30, connected to the wireless charging receiving apparatus 20, and configured to determine a distance between the wireless charging transmitting apparatus 10 and the wireless charging receiving apparatus 20 according to the electromagnetic intensity, and control a status of the autonomous moving device according to the distance.

According to the wireless charging apparatus of autonomous moving device provided in the present embodiment, the wireless charging receiving apparatus 20 detects the electromagnetic intensity of the electromagnetic signal of the wireless charging transmitting apparatus 10, and the control apparatus 30 determines the distance between the wireless charging transmitting apparatus 10 and the wireless charging receiving apparatus 20 according to the electromagnetic intensity, thereby controlling the status of the autonomous moving device according to the distance. For example, when the autonomous moving device does not need to be charged, the wireless charging transmitting apparatus 10 is avoided. When the autonomous moving device needs to be charged, the autonomous moving device is made to find accurately the location of the wireless charging transmitting apparatus 10 for charging. A distance between the autonomous moving device and a charging station is prevented from being measured by using a wireless communication sensor module such as WiFi or Bluetooth, thereby reducing the product costs and increasing the price-performance ratio.

Specifically, the autonomous moving device is an autonomous lawn mower, and the wireless charging apparatus of the autonomous moving device further includes a wireless charging station, and the wireless charging transmitting apparatus 10 is disposed on the wireless charging station. The wireless charging receiving apparatus 20 disposed on the autonomous lawn mower can detect electromagnetic intensity of the electromagnetic signal of the wireless charging transmitting apparatus 10, the control apparatus 30 disposed on the autonomous lawn mower determines, according to the electromagnetic intensity, the distance between the wireless charging transmitting apparatus 10 and the wireless charging receiving apparatus 20, and the control apparatus 30 controls a status of the autonomous lawn mower according to the distance. When the autonomous lawn mower is fully charged, the control apparatus 30 controls, according to the distance, the autonomous lawn mower to move. That is, if the distance is relatively small, the control apparatus 30 controls the autonomous lawn mower to adjust a direction to get round the wireless charging station. When the distance is relatively large, the control apparatus 30 controls the autonomous lawn mower to continue to move towards the original movement direction. When the autonomous lawn mower is inadequate in electricity and needs to be charged, the control apparatus 30 controls the autonomous lawn mower to move towards the location of the wireless charging station, and after the autonomous lawn mower reaches the wireless charging station, the wireless charging receiving apparatus 20 on the autonomous lawn mower docks to the wireless charging transmitting apparatus 10 on the wireless charging station, to charge the autonomous lawn mower. In addition, in this case, the wireless charging receiving apparatus 20 is closest to the wireless charging transmitting apparatus 10 of the wireless charging station, and battery intensity received by the wireless charging receiving apparatus 20 is the strongest. Therefore, during charging, the electromagnetic energy transmission efficiency between the wireless charging receiving apparatus 20 and the wireless charging transmitting apparatus 10 is the highest.

In this embodiment, the wireless charging apparatus of the autonomous moving device further includes:
an identifying apparatus 40, configured to identify the wireless charging transmitting apparatus 10.

The identifying apparatus 40 may identify the wireless charging transmitting apparatus 10. After the identifying apparatus 40 identifies the wireless charging transmitting apparatus 10, the wireless charging receiving apparatus 20 detects electromagnetic intensity of the wireless charging transmitting apparatus 10, and the control apparatus 30 receives the electromagnetic intensity, and determines a distance between the wireless charging transmitting apparatus 10 and the wireless charging receiving apparatus 20 according to the electromagnetic intensity. When the autonomous moving device is inadequate in electricity, the control apparatus 30 controls the autonomous moving device to move towards the wireless charging transmitting apparatus 10, thereby aligning the wireless charging receiving apparatus 20 on the autonomous moving device with the wireless charging transmitting apparatus 10, to charge the autonomous moving device when the electromagnetic energy transmission efficiency between the wireless charging receiving apparatus 20 and the wireless charging transmitting apparatus 10 is the highest.

When applied to the autonomous lawn mower, the identifying apparatus 40 identifies the wireless charging transmitting apparatus 10, and then the wireless charging receiving apparatus 20 detects electromagnetic intensity of the wireless charging transmitting apparatus 10. The control apparatus 30 receives the electromagnetic intensity and determines the distance between the wireless charging transmitting apparatus 10 and the wireless charging receiving apparatus 20 according to the electromagnetic intensity, and the control apparatus 30 controls the autonomous lawn mower to move to the charging station.

Further, there may be multiple electromagnetic signals in free space, and the wireless charging receiving apparatus 20 is configured to receive an electromagnetic signal and send the electromagnetic signal to the identifying apparatus 40. Therefore, when a pulse interval of the electromagnetic signal received by the wireless charging receiving apparatus 20 is equal to a pulse interval of an electromagnetic signal sent by the wireless charging transmitting apparatus 10, the electromagnetic signal received by the wireless charging receiving apparatus 20 is identified as the electromagnetic signal sent by the wireless charging transmitting apparatus 10.

A resonance frequency of the wireless charging transmitting apparatus 10 is equal to a resonance frequency of the wireless charging receiving apparatus 20. Therefore, when no device that needs to be charged is docked to the wireless charging transmitting apparatus 10, the wireless charging transmitting apparatus 10 sends an electromagnetic signal outwards at a long time interval. Under the resonance frequency of the wireless charging transmitting apparatus 10, the identifying apparatus 40 identifies an electromagnetic signal in free space constantly. When a pulse interval of the identified electromagnetic signal is equal to the pulse interval of the electromagnetic signal of the wireless charging transmitting apparatus 10, the identifying apparatus 40 identifies the apparatus that has the electromagnetic signal as the wireless charging transmitting apparatus 10.

Specifically, after the control apparatus 30 determines the distance between the wireless charging transmitting apparatus 10 and the wireless charging receiving apparatus 20 according to the electromagnetic intensity, the control apparatus 30 controls an autonomous moving device to move towards the wireless charging transmitting apparatus 10 when the autonomous moving device needs to be charged.

Further, referring to FIG. 14, in this embodiment, the wireless charging transmitting apparatus 10 includes a wireless charging transmitting end, which is specifically a transmitting coil 12. The wireless charging receiving apparatus 20 includes a wireless charging receiving end, which is specifically a receiving coil 22. The control apparatus 30 determines, according to electromagnetic intensity, a distance between the center of the receiving coil 22 and the center of the transmitting coil 12, and controls the autonomous moving device to move towards the transmitting coil 12.

During wireless charging, the center of the transmitting coil 10 of the wireless charging transmitting apparatus 10 and the center of the receiving coil 22 of the wireless charging receiving apparatus 20 need to be aligned for the charging. Therefore, the distance between the center of the transmitting coil 10 of the wireless charging transmitting apparatus 10 and the center of the receiving coil 22 of the wireless charging receiving apparatus 20 is determined, to align the wireless charging transmitting apparatus 10 with the wireless charging receiving apparatus 20.

Further, when the autonomous moving device needs to be charged, and when the distance between the wireless charging transmitting apparatus 10 and the wireless charging receiving apparatus 20 is less than or equal to a first preset threshold, the control apparatus 30 controls the autonomous moving device to move slowly. In addition, the control apparatus 30 may further control a posture of the moving device to be correspondingly adjusted, so that an optimal cooperation status is achieved between the wireless charging receiving apparatus 20 and the wireless charging transmitting apparatus 10. When the distance between the wireless charging transmitting apparatus 10 and the wireless charging receiving apparatus 20 is not less than the first preset threshold, the autonomous moving device may accelerate towards the wireless charging transmitting apparatus 10 or approach the wireless charging transmitting apparatus 10 at a relatively high speed.

Further, the control apparatus 30 is further configured to: when the distance between the wireless charging transmitting apparatus 10 and the wireless charging receiving apparatus 20 is less than or equal to a second preset threshold, determine that the wireless charging receiving apparatus 20 is aligned with the wireless charging transmitting apparatus 10 and start charging. In addition, in this case, the wireless charging receiving apparatus 20 is closest to the wireless charging transmitting apparatus 10 of the wireless charging station, and battery intensity of the wireless charging receiving apparatus 20 is the strongest. Therefore, during the charging, the electromagnetic energy transmission efficiency between the wireless charging receiving apparatus 20 and the wireless charging transmitting apparatus 10 is the highest.

During actual application, values of the first preset threshold and the second preset threshold may be determined according to the maximum intensity of the electromagnetic signal sent by the wireless charging transmitting apparatus 10. That is, the values of the first preset threshold and the second preset threshold are related to the highest electromagnetic energy transmission efficiency between the receiving coil 22 and the transmitting coil 12. The second preset threshold is less than the first preset threshold.

Referring to FIG. 15, an embodiment of the present invention further provides an autonomous moving device wireless charging method, including steps:

S210: A wireless charging transmitting apparatus transmits an electromagnetic signal.

S220: A wireless charging receiving apparatus receives and detects electromagnetic intensity of the electromagnetic signal transmitted by the wireless charging transmitting apparatus.

S230: Determine a distance between the wireless charging receiving apparatus and the wireless charging transmitting apparatus according to the electromagnetic intensity.

S240: Control a status of the autonomous moving device.

According to the autonomous moving device wireless charging method provided in this embodiment of the present invention, the electromagnetic intensity of the electromagnetic signal of the wireless charging transmitting apparatus 10 is detected, and the distance between the wireless charging receiving apparatus 20 and the wireless charging transmitting apparatus 10 is determined according to the electromagnetic intensity, to control the status of the autonomous moving device. When the autonomous moving device does not need to be charged, the wireless charging transmitting apparatus 10 is avoided. When the autonomous moving device needs to be charged, the autonomous moving device finds accurately the location of the wireless charging transmitting apparatus 10 to perform charging. The distance between the autonomous moving device and the charging station is prevented from being measured by using a wireless communication sensor module such as WiFi or Bluetooth, thereby reducing the product costs and increasing the price-performance ratio.

Further, before the wireless charging receiving apparatus 20 receives and detects the electromagnetic intensity of the electromagnetic signal transmitted by the wireless charging transmitting apparatus 10, the method further includes the following steps:

identifying the wireless charging transmitting apparatus 10.

In this embodiment, the wireless charging transmitting apparatus 10 is identified first, then the electromagnetic intensity of the wireless charging transmitting apparatus 10 is detected, and the distance between the wireless charging receiving apparatus 20 and the wireless charging transmitting apparatus 10 is determined according to the electromagnetic intensity.

Further, the step of identifying the wireless charging transmitting apparatus 10 includes:

transmitting, by the wireless charging transmitting apparatus 10, an electromagnetic signal, where a pulse interval of the electromagnetic signal is a time T; and receiving an electromagnetic pulse, determining whether a pulse interval t of the received electromagnetic pulse is equal to the pulse interval T of the electromagnetic signal sent by the wireless charging transmitting apparatus 10, and if yes, determining that the apparatus is the wireless charging transmitting apparatus 10; or if not, continuing to search for the wireless charging transmitting apparatus 10.

In one embodiment thereof, the step of determining the distance between the wireless charging receiving apparatus 20 and the wireless charging transmitting apparatus 10 according to the electromagnetic intensity includes:

detecting a peak value $\delta A$ of the electromagnetic intensity; and determining a distance $\delta r$ between the center of the receiving coil 22 of the wireless charging receiving apparatus 20 and the center of the transmitting coil 12 of the wireless charging transmitting apparatus 10 according to the $\delta A$.

Specifically, the $\delta A$ is inversely proportional to the $\delta r$.

A smaller $\delta A$ indicates a larger $\delta r$, and it proves that the wireless charging receiving apparatus 20 is more distant from the wireless charging transmitting apparatus 10. A larger $\delta A$ indicates a smaller $\delta r$, and it proves that the wireless charging receiving apparatus 20 is closer to the wireless charging transmitting apparatus 10.

In one embodiment thereof, when the autonomous moving device needs to be charged, the autonomous moving device is controlled to move towards a location at which the wireless charging transmitting apparatus 10 is located.

Further, the step of controlling the autonomous moving device to move towards a location at which the wireless charging transmitting apparatus 10 is located includes:

when the distance between the wireless charging receiving apparatus 20 and the wireless charging transmitting apparatus 10 is less than a first preset threshold, the autonomous moving device slowly moves towards the location at which the wireless charging transmitting apparatus 10 is located.

When determining that the distance between the wireless charging transmitting apparatus 10 and the wireless charging receiving apparatus 20 is less than or equal to the first preset threshold, the autonomous moving device may adjust a posture and approach a station at a low speed, until detecting that the electromagnetic intensity is the maximum, and finally aligning the wireless charging receiving apparatus 20 with the wireless charging transmitting apparatus 10.

Specifically, when the distance between the wireless charging transmitting apparatus 10 and the wireless charging receiving apparatus 20 is less than or equal to the second preset threshold, it is determined that the wireless charging receiving apparatus 20 is already aligned with the wireless charging transmitting apparatus 10, and charging is started.

The following describes another embodiment of the present invention with reference to FIG. 16 to FIG. 21.

When an autonomous lawn mower returns to a wireless charging station for charging, alignment of a charging receiving end of the autonomous lawn mower with a power supplying transmitting end of the charging station is a technical difficulty. If this technical difficulty cannot be resolved, usually alignment cannot be achieved in time, resulting in that the autonomous lawn mower cannot be charged in time, and affecting next-time use.

In one embodiment thereof, when a wireless charging receiving end (the charging receiving end for short) of the autonomous lawn mower docks to a wireless charging transmitting end (the power supplying transmitting end for short) of the charging station, the charging receiving end receives energy from the power supplying transmitting end. A receiving and processing unit sends a nominal voltage signal to a control board only when the charging receiving end is already aligned with the power supplying transmitting end of the charging station and the energy received by the charging receiving end reaches a preset value. After receiving the nominal voltage signal, the control board starts to charge the lawn mower.

However, in a process in which the lawn mower moves along a boundary line, there is swinging in the moving. Therefore, complete alignment of the charging receiving end with the power supplying transmitting end cannot be ensured, and there is a deviation. When the deviation reaches a specified value, the receiving and processing unit cannot send the nominal voltage signal. Therefore, the control board cannot receive the nominal voltage signal, and the lawn mower moves beyond the power supplying transmitting end, and cannot be docked for charging.

After further research, the embodiments of the present invention provide a wireless docking and charging method and system for an autonomous lawn mower. A first electrical signal of the charging receiving end is directly detected, and before the nominal voltage signal is received, the lawn mower is controlled to move correspondingly, according to whether a value of the first electrical signal is greater than a predetermined value and whether a second electrical signal is detected within the time T, thereby completing the docking between the charging receiving end of the lawn mower and the power supplying transmitting end of the charging station.

To enable the foregoing objectives, characteristics, and advantages of the present invention to be clearer and easier to understand, the following describes specific embodiments of the present invention in detail with reference to accompanying drawings.

Figure 16:
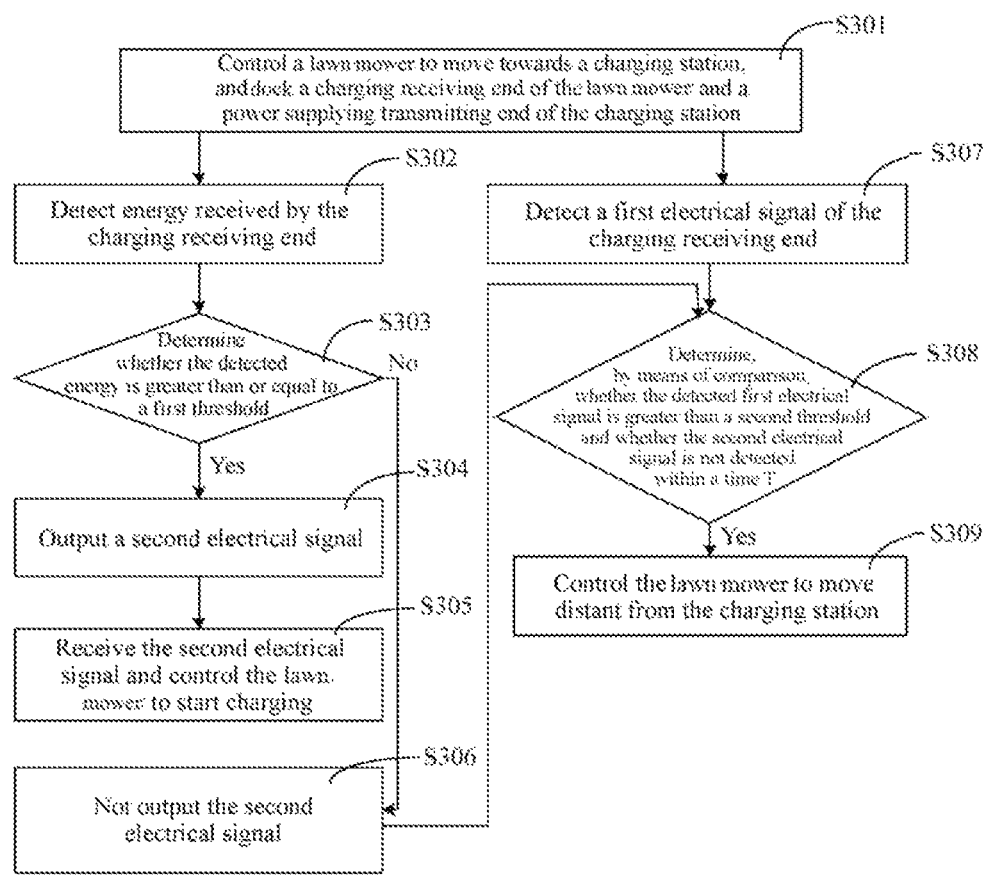
FIG. 16 is a schematic flowchart of a wireless docking and charging method for a lawn mower according to an embodiment.

Referring to FIG. 16, FIG. 16 is a schematic flowchart of a wireless docking and charging method for a lawn mower according to an embodiment.

The wireless docking and charging method for the lawn mower includes: performing step S301 of controlling the lawn mower to move towards a charging station, and docking a charging receiving end of the lawn mower to a power supplying transmitting end of the charging station; performing step S302 of detecting energy received by the charging receiving end; performing step S303 of determining whether the detected energy is greater than or equal to a first threshold, and if yes, that is, the detected energy is greater than or equal to the first threshold, performing step S304 of outputting a second electrical signal, and then performing step S305 of receiving the second electrical signal and controlling the lawn mower to start charging; or if not, that is, the detected energy is less than the first threshold, performing step S306 of not outputting the second electrical signal; performing step S307 of detecting a first electrical signal of the charging receiving end, and if the first electrical signal is detected but the second electrical signal is not received, performing step S308 of determining, by means of comparison, whether the detected first electrical signal is greater than a second threshold and whether the second electrical signal is not detected within a time T, and if yes, performing step S309 of controlling the lawn mower to move distant from the charging station, and then performing step S301.

Figure 17:
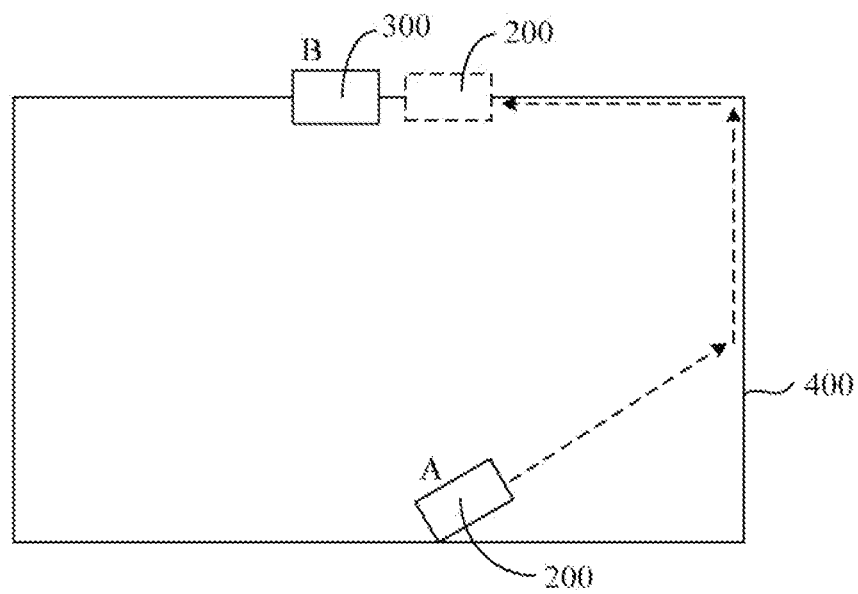
FIG. 17 is a schematic diagram of a moving path planned by the lawn mower in the embodiment shown in FIG. 16 according to a location of a charging station after receiving a charging signal.

Referring to FIG. 17, FIG. 17 is a schematic diagram of a moving path planned by an autonomous lawn mower 200 according to a location of a charging station 300 after receiving a charging signal. When encountering, at a location A, inadequate energy (such as an excessively low voltage), a long stand-by time, or bad weather, the autonomous lawn mower 200 sends a charging signal, and obtains geographic location information of the lawn mower 200 at the location A; and with reference to geographic location information of the charging station 300 at a location B, plans a moving path (shown by the dashed lines in the figure) along which the lawn mower 200 returns to the charging station 300. Some segments of the moving path are consistent with a boundary line 400, so that both the charging station 300 and the lawn mower 200 are located on the boundary line 400 to perform docking.

When the lawn mower 200 is close to the charging station 300, a charging receiving end of the lawn mower 200 docks to a power supplying transmitting end of the charging station. The docking may be in a contact manner, or may be in a non-contact manner. For example, a wireless docking manner is used to transmit energy from the power supplying transmitting end to the charging receiving end. In this embodiment, the charging receiving end of the lawn mower 200 is a receiving coil, the power supplying transmitting end of the charging station is a transmitting coil, and docking between the two is in the wireless manner. When the receiving coil begins to enter an area above the transmitting coil, the receiving coil begins to receive energy from the transmitting coil. However, the receiving coil and the transmitting coil are fully aligned only when the receiving coil fully enters the area above the transmitting coil. In this case, the receiving coil can receive the energy of the transmitting coil to the uttermost. In addition, in this embodiment, the shape and the size of the receiving coil are respectively the same as the shape and the size of the transmitting coil.

It should be noted that, in another embodiment, it may alternatively be that: the shape of the receiving coil is the same as the shape of the transmitting coil, but the diameter of the receiving coil is smaller than the diameter of the transmitting coil.

Figure 18:
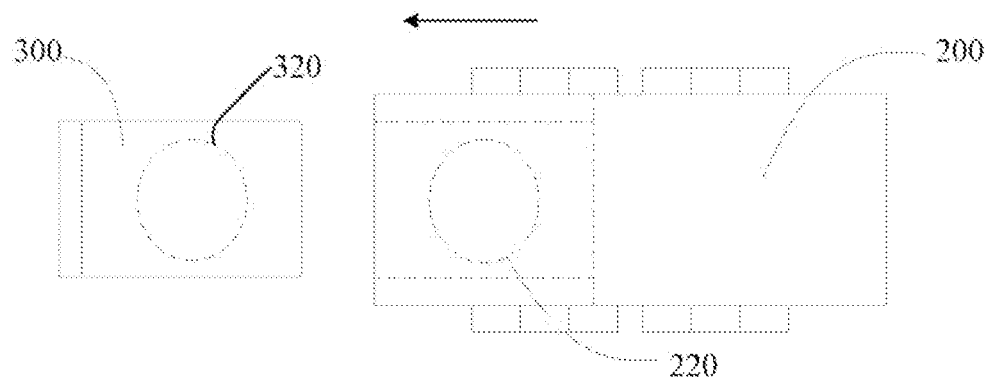
FIG. 18 is a schematic top view of docking between the lawn mower and the charging station in the embodiment shown in FIG. 16.
Figure 19:
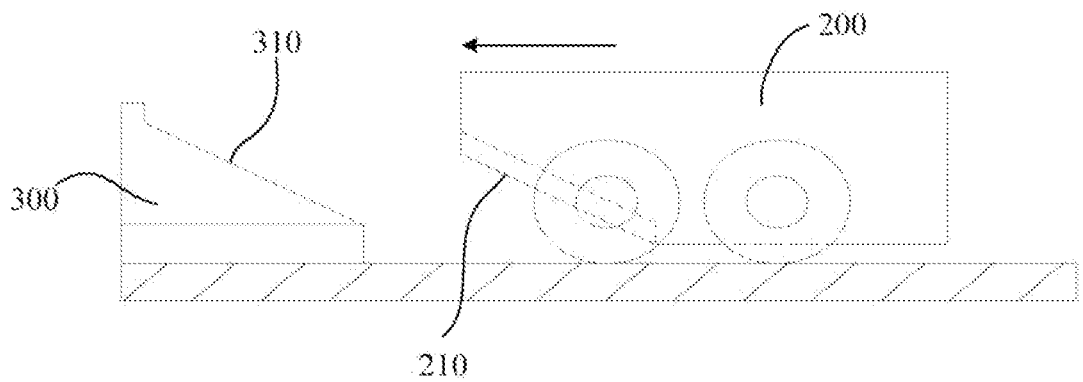
FIG. 19 is a schematic side view of docking between the lawn mower and the charging station in the embodiment shown in FIG. 16.
Figure 20:
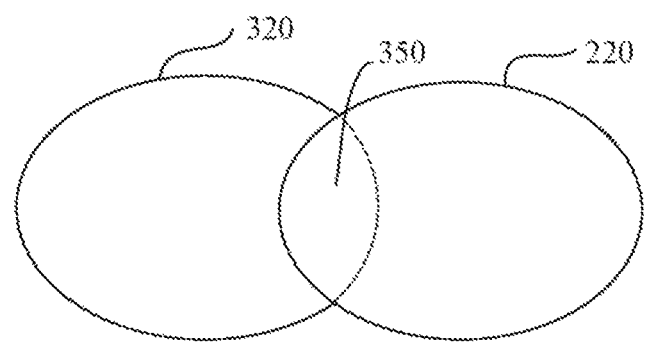
FIG. 20 is a schematic top view of docking between a receiving coil and a transmitting coil of the lawn mower in the embodiment shown in FIG. 16.

Referring to FIG. 18 to FIG. 20, FIG. 18 is a schematic top view of docking between an autonomous lawn mower 200 and a charging station 300 according to an embodiment, FIG. 19 is a schematic side view of docking between an autonomous lawn mower 200 and a charging station 300 according to an embodiment, and FIG. 20 is a schematic top view of docking between a transmitting coil 320 and a receiving coil 220.

In this embodiment, there is a first incline surface 210 at the bottom of a front end of the autonomous lawn mower 200, and there is a second incline surface 310 on the surface of an end that is of the charging station 300 and that faces towards the autonomous lawn mower 200. The receiving coil 220 of the autonomous lawn mower 200 is disposed within a corresponding area of the first incline surface 210 of the lawn mower 200, and the transmitting coil 320 of the charging station 300 is disposed within a corresponding area of the second incline surface 310. In a docking process, the autonomous lawn mower 200 moves forward in the direction indicated by the arrow in the figure, and when the receiving coil 220 is close to the transmitting coil 320, the receiving coil 220 begins to receive energy from the transmitting coil 320.

After a charging receiving end of the autonomous lawn mower 200 docks to a power supplying transmitting end of the charging station 300, the charging receiving end receives the energy of the power supplying transmitting end. In addition, as a distance between the charging receiving end and the power supplying transmitting end changes, a value of the energy received by the charging receiving end correspondingly changes. A charging requirement is satisfied only when the energy received by the charging receiving end reaches a specified value. In this embodiment, the energy received by the charging receiving end is detected, and the detected energy is compared with a first threshold. The first threshold is an energy threshold, and is used for measuring whether the charging receiving end and the power supplying transmitting end are aligned, and whether the charging requirement can be satisfied. Specifically, when the detected energy is greater than the first threshold, it is determined that the charging receiving end and the power supplying transmitting end are already aligned, and the subsequent charging requirement can be satisfied. On the contrary, when the detected energy is less than the first threshold, it is determined that the charging receiving end and the power supplying transmitting end are not aligned, and the subsequent charging requirement cannot be satisfied.

To charge the lawn mower, in this embodiment, when the detected energy is greater than or equal to the first threshold, a second electrical signal is output. A control board of the autonomous lawn mower controls, only after receiving the second electrical signal, the lawn mower to start charging. When the detected energy is less than the first threshold, no second electrical signal is output. As a result, the autonomous lawn mower cannot be controlled to start charging. In this embodiment, the second electrical signal is a nominal output voltage, and is used for providing a signal for charging the autonomous lawn mower, and the second electrical signal is output to the control board by a receiving and processing circuit.

It should be noted that, in another embodiment, the second electrical signal may alternatively be a nominal output current or a nominal output power. Details are not described herein.

It should be noted that, the first threshold is a corresponding energy threshold, and the determining of whether the energy received by the charging receiving end satisfies a charging requirement is affected by multiple factors, such as an angle by which the charging receiving end docks to the power supplying transmitting end, a docking area, or a docking distance. Therefore, when the first threshold is set, the foregoing factors need to be comprehensively considered. Specifically, a person skilled in the art may set a value of the first threshold according to a specific situation, as long as the charging requirement can be satisfied. Details are not described herein.

It should be noted that, during the docking between the charging receiving end and the power supplying transmitting end, regardless of docking in a contact manner or docking in a non-contact manner, that is, regardless of whether the charging receiving end is in contact with the power supplying transmitting end, it is considered that the two are aligned, as long as the energy received by the charging receiving end can satisfy the subsequent charging requirement.

As described in the foregoing, in a conventional case, if no second electrical signal is received, the autonomous lawn mower continues to be controlled to move forward. However, according to a conventional docking method, even if the autonomous lawn mower has moved beyond the charging station, and is becoming more distant from the charging station, the autonomous lawn mower cannot detect this situation; or although the autonomous lawn mower can sense an output electrical signal, the output electrical signal is always relatively weak and the second electrical signal is not received for a long time, and therefore the charging receiving end and the power supplying transmitting end cannot be aligned in time, causing charging to be delayed, and seriously affecting the user experience.

Based on the foregoing consideration, in this embodiment, detection is performed on the first electrical signal of the charging receiving end, and it is determined, by means of comparison, whether the first electrical signal is greater than a second threshold and whether the second electrical signal is not detected within a time T, so as to correspondingly control a movement direction of the lawn mower, so that the second electrical signal is received more quickly.

It is considered that, when the autonomous lawn mower 200 returns to the charging station 300 for charging, some segments of a moving path of the autonomous lawn mower 200 are consistent with the boundary line 400, that is, the charging receiving end of the autonomous lawn mower 200 always docks to the power supplying transmitting end of the charging station in a fixed direction and at a fixed height. A value of the output electrical signal of the charging receiving end can roughly reflect a relative location relationship between the charging receiving end and the power supplying transmitting end, thereby providing a reference basis for a next step of movement of the autonomous lawn mower 200. That is, detection is performed on the output electrical signal of the charging receiving end, and when no second electrical signal is received, simply by comparing the value of the output electrical signal with a value of the second threshold, a location of the charging receiving end of the autonomous lawn mower 200 relative to the power supplying transmitting end of the charging station 300 can be roughly determined, and a direction of the next step of movement of the autonomous lawn mower 200 can be determined.

That is, in this embodiment, the first electrical signal is the output electrical signal of the charging receiving end, and the second threshold is a corresponding electrical signal threshold. When the output electrical signal of the charging receiving end is an output voltage, the second threshold is a voltage threshold. When the output electrical signal of the charging receiving end is an output current, the second threshold is a current threshold. In this embodiment, the first electrical signal is a DC output voltage of the receiving coil 320, the output electrical signal is detected by using the control board, and the second threshold is a voltage threshold.

The second threshold may be set in advance, to facilitate subsequent comparison. To prevent that when the charging receiving end and the power supplying transmitting end are not aligned, the second electrical signal is not output in time, or the second electrical signal is not received in time, the lawn mower is already controlled to move distant from the charging station. In one embodiment thereof, the time T is zero. In this case, the second threshold is an electrical signal threshold, and a value of the electrical signal threshold should be slightly greater than that of a corresponding electrical signal generated when the charging receiving end and the power supplying transmitting end are aligned. For example, the charging receiving end is the receiving coil 220, and the power supplying transmitting end is the transmitting coil 320. Alignment is performed to output the second electrical signal, only after a docking area 350 between the receiving coil 220 and the transmitting coil 320 accounts for at least 80% of a total area of the charging receiving end. Then, the second threshold should be greater than an output voltage or an output current of a corresponding charging receiving end when a docking area between the charging receiving end and the power supplying transmitting end accounts for 80%. Preferably, the second threshold is set to an output voltage or an output current of a corresponding charging receiving end when the docking area between the charging receiving end and the power supplying transmitting end accounts for 90%.

It should be noted that, in another embodiment, the time T may alternatively be set to greater than zero, a value of the second threshold remains consistent with that of a corresponding electrical signal when the charging receiving end and the power supplying transmitting end are aligned, or a value of the second threshold is slightly greater than that of a corresponding electrical signal when the charging receiving end and the power supplying transmitting end are aligned.

In this way, when it is detected that the output electrical signal of the charging receiving end is greater than the second threshold, if the second electrical signal is not received within the time T, it indicates that the autonomous lawn mower 200 has already moved beyond the charging station 300. The autonomous lawn mower 200 needs to be controlled to move distant from the charging station 300, and then docking needs to be performed again between the charging receiving end and the power supplying transmitting end, so that the autonomous lawn mower 200 is charged in time.

When a relatively large deviation of a moving path of the lawn mower occurs, the second electrical signal may not be received even if the first electrical signal is received or the first electrical signal reaches a specified value.

In another embodiment, the first electrical signal is an output electrical signal of the charging receiving end, and the second threshold may alternatively be zero. That is, after the first electrical signal is detected, if the second electrical signal is not detected within the time T, the lawn mower is controlled to move distant from the charging station.

In this embodiment, the wireless docking method for the lawn mower includes: starting timing from a time when the first electrical signal is detected, if the second electrical signal is not received within the time T, controlling the autonomous lawn mower 200 to move distant from the charging station 300, and then docking the charging receiving end to the power supplying transmitting end again. For example, if the second threshold is set to zero volts and the time T is set to 100 seconds, timing is started from a time when the first electrical signal is detected. When the second electrical signal is not received after 100 seconds have elapsed, the autonomous lawn mower 200 moves distant from the charging station 300, and the charging receiving end docks to the power supplying transmitting end again.

It should be noted that, in another embodiment, the second threshold may alternatively be less than another value of the corresponding electrical signal when the charging receiving end and the power supplying transmitting end are aligned, and the time T may alternatively be another value. For example, if the second threshold is set to five volts and the time T is set to 110 seconds, timing is started from a time when the output voltage of the charging receiving end reaches five volts. If the second electrical signal is not received after 110 seconds have elapsed, the autonomous lawn mower 200 needs to be controlled to move distant from the charging station 300, and then the charging receiving end docks to the power supplying transmitting end again.

It should be noted that, in another embodiment, for the wireless docking and charging method for the lawn mower, the cases in the foregoing embodiments may be comprehensively considered. Details are not described herein again.

Further, to prevent that the charging receiving end is aligned with the power supplying transmitting end and then immediately the alignment fails due to an excessively high speed of the lawn mower, this embodiment further includes: after the first electrical signal is detected, the lawn mower is controlled to decelerate, and the speed of the lawn mower is reduced to zero when the second electrical signal is detected, so that the charging receiving end and the power supplying transmitting end can be slowly and accurately aligned, increasing the docking accuracy.

In this embodiment, after the second electrical signal is received, the autonomous lawn mower 200 is controlled to start charging, and at the same time, the autonomous lawn mower 200 stops moving.

It should be noted that, in another embodiment of the present invention, in a process of charging the autonomous lawn mower 200, the autonomous lawn mower may further continue to move towards the charging station 300, so that the energy received by the charging receiving end of the autonomous lawn mower 200 can reach the maximum, to make a charging effect better.

Figure 21:
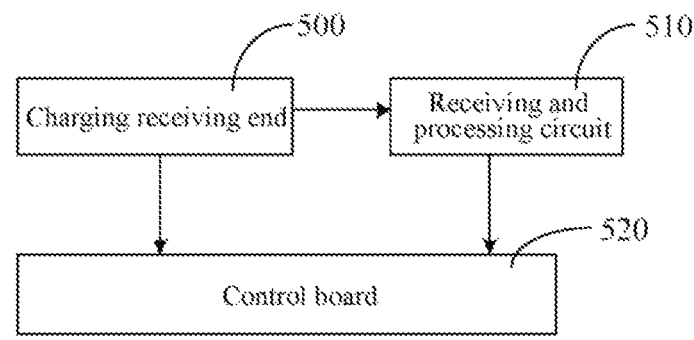
FIG. 21 is a schematic structural diagram of a wireless docking and charging system for a lawn mower according to another embodiment.

Referring to FIG. 21, in still another embodiment, a wireless docking and charging system for an autonomous lawn mower is further provided, including a charging receiving end 500, a receiving and processing circuit 510, and a control board 520.

The charging receiving end 500 is configured to dock to a power supplying transmitting end (not shown) of a charging station, to receive energy of the power supplying transmitting end. In this embodiment, the charging receiving end 500 is a receiving coil, the power supplying transmitting end of the charging station is a transmitting coil, and by docking the receiving coil to the transmitting coil, to transmit energy. In addition, in a preferred example, the size and the shape of the receiving coil are respectively the same as the size and the shape of the transmitting coil.

The receiving and processing circuit 510 is in communication connection with the charging receiving end 500, and is configured to: detect energy received by the charging receiving end 500, and when detecting that the detected energy is greater than a first threshold, determine that the charging receiving end 500 and the power supplying transmitting end are aligned, and output a second electrical signal; otherwise, not output a second electrical signal. In this embodiment, an A/D converter is disposed in the receiving and processing circuit 510, and is configured to: detect the energy received by the charging receiving end 500, and convert the detected energy from an analog signal into a digital signal, to facilitate subsequent comparison with the first threshold. A comparer in communication connection with the A/D converter is further disposed in the receiving and processing unit 510, and is configured to compare a relationship between the detected energy which is converted into digital signal and a first threshold. In addition, to output a second electrical signal, a signal output unit in communication connection with the comparer is further disposed in the receiving and processing circuit 510. The second electrical signal is output only when it is detected that the energy is greater than or equal to the first threshold; otherwise, the second electrical signal is not output. Due to the existence of the A/D converter, the detected energy of the charging receiving end may be converted from an analog signal to a digital signal, to facilitate subsequent comparison. Therefore, the processing efficiency of the receiving and processing circuit is higher, and the second electrical signal may be relatively quickly output when the charging receiving end and the power supplying transmitting end are aligned. The second electrical signal is a nominal output voltage.

The control board 520 is in communication connection with the charging receiving end 500, and is in communication connection with the receiving and processing circuit 510; and is configured to: control the lawn mower to move, and detect a first electrical signal of the charging receiving end 500, and receive a second electrical signal. When the first electrical signal is detected but the second electrical signal is not received, determine whether the first electrical signal is greater than second threshold, and if the first electrical signal is greater than the second threshold and the second electrical signal is not detected within the time T, control the lawn mower to move distant from the charging station, and then dock the charging receiving end 500 to the power supplying transmitting end again. After receiving the second electrical signal, the control board 520 controls the lawn mower to start charging. In this embodiment, to determine whether the first electrical signal is greater than the second threshold, a comparer is also disposed in the control board 520.

The first electrical signal is the output electrical signal of the charging receiving end, and the second threshold is a corresponding electrical signal threshold. For example, when the first electrical signal is an output voltage of the charging receiving end, the second threshold is a corresponding voltage threshold; when the second electrical signal is an output current of the charging receiving end, the second threshold is a corresponding current threshold.

In this embodiment, a timing unit is further disposed in the control board 520. The timing unit is configured to record a time after the first electrical signal reaches the second threshold. When the control board does not receive the second electrical signal after the time T, it is considered that there is a relatively large deviation of a moving path of the lawn mower, and the control board controls the lawn mower to move distant from the charging station, and then dock the charging receiving end 500 to the power supplying transmitting end again. A time period from a time the first electrical signal reaches the second threshold to a time the second electrical signal is received is limited. When the second electrical signal is not received for a long time, the charging receiving end 500 and the power supplying transmitting end may be made to dock again, increasing the docking efficiency.

In one embodiment thereof, the second threshold may be set to zero, and the time T may be greater than zero. That is, timing is started from a time when the first electrical signal is detected, if the second electrical signal is not received within the time T, the lawn mower is controlled to move distant from the charging station, for example, retreating, and then the charging receiving end 500 and the power supplying transmitting end are made to dock again.

In still another embodiment, the second threshold may be set to be greater than zero, and the time T may be set to be greater than zero; or the second threshold may be set to be greater than zero, and the time T may be set to zero. Details are not described herein again.

By using the foregoing wireless docking and charging system for the autonomous lawn mower, when docking the first electrical signal but not receiving the second electrical signal, the control board 520 may control, in a targeted manner according to a relationship between the first electrical signal and a value of the second threshold and a relationship between the first electrical signal and the time T, the lawn mower to move, for example, move towards the charging station or move distant from the charging station, and after the lawn mower moves from the charging station, dock the charging receiving end 500 of the lawn mower to the power supplying transmitting end of the charging station again. That the lawn mower moves beyond the power supplying transmitting end and docking cannot be performed for charging is prevented.

To prevent the case that if a speed of the autonomous lawn mower is relatively high in a docking process, the charging receiving end 500 is aligned with the power supplying transmitting end and then immediately the alignment fails, in this embodiment, the control board 520 is further configured to: after detecting the first electrical signal, control the autonomous lawn mower to decelerate, when the second electrical signal is received, control a speed of the lawn mower to reduce to zero.

For more related descriptions about the wireless docking and charging system for the autonomous lawn mower, refer to the related descriptions about the wireless docking and charging method for the autonomous lawn mower. Details are not described herein again.

The following describes another implementation of the present invention with reference to FIG. 22 to FIG. 26.

Figure 22:
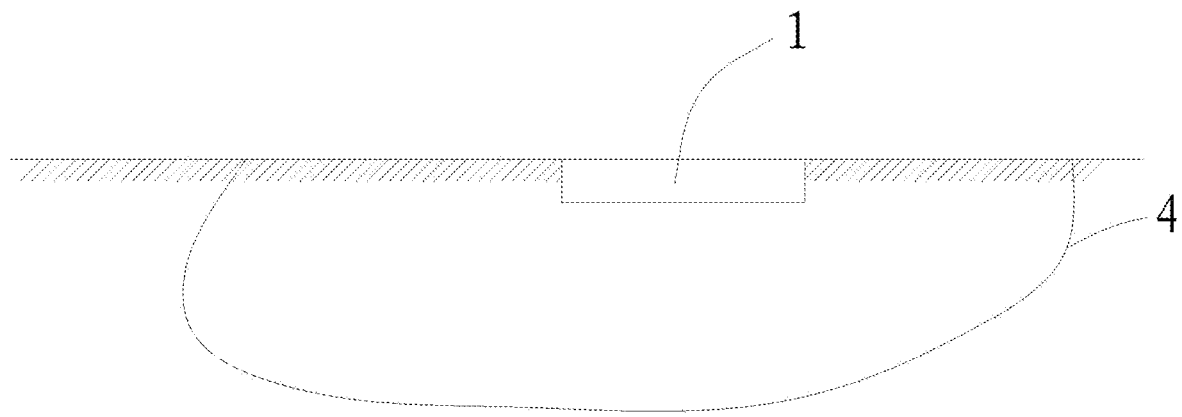
FIG. 22 is a structural diagram of a wireless charging station.

Wireless charging requires a transmitting end and a receiving end of a wireless electromagnetic signal. The wireless charging may be performed after the transmitting end and the receiving end satisfy a corresponding location relationship. Therefore, as shown in FIG. 22, a wireless charging station needs to be disposed within a movement range of an autonomous moving device, or referred to as an automatic self-propelling device. The wireless charging station includes a wireless charging transmitting end 1. The wireless charging transmitting end 1 may be buried under the ground or slightly protruding from the ground.

Figure 23:
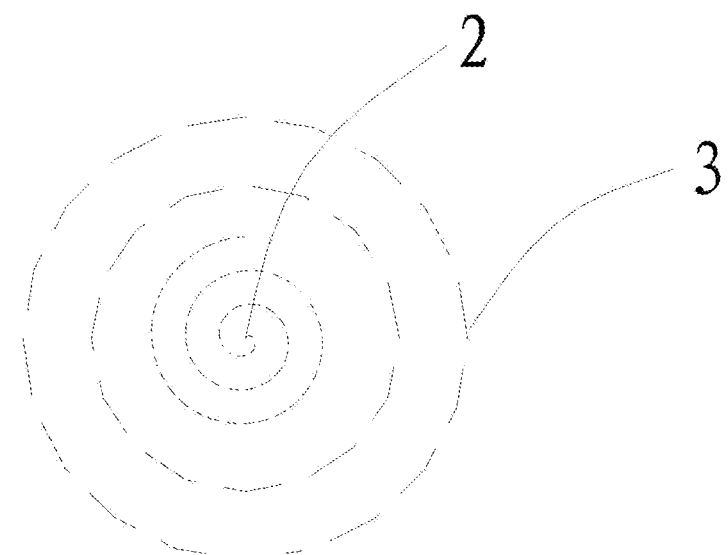
FIG. 23 is a top view of a shielder of an automatic self-propelling device wireless charging system according to an embodiment.
Figure 24:
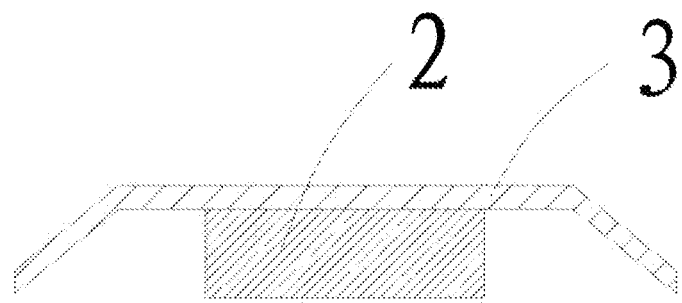
FIG. 24 is a sectional view of a shielder of an automatic self-propelling device wireless charging system according to an embodiment.

The automatic self-propelling device generally includes a shell and a moving wheel that is mounted under the shell. A battery is disposed in the shell. The battery is connected to a wireless charging receiving end 2 that is disposed in the shell and that is configured to receive a signal transmitted by the wireless charging transmitting end 1 and charge the battery. To prevent a magnetic leakage phenomenon, as shown in FIG. 23 and FIG. 24, a shielder 3 in an embodiment whose area is greater than that of the wireless charging receiving end 2 or the wireless charging transmitting end 1 is disposed on the wireless charging receiving end 2 of a wireless charging system of the automatic self-propelling device. The area of the shielder 3 is relatively large. Therefore, when a charge distance between the wireless charging receiving end 2 and the wireless charging transmitting end 1 needs to be increased, if the area of the wireless charging transmitting end 1 is increased, it can be ensured that the magnetic leakage phenomenon does not occur as long as the area of the wireless charging transmitting end 1 is less than the area of the shielder 3. Therefore, properly increasing the area of the shielder 3 may increase a degree of freedom and a distance of the wireless charging.

According to the automatic self-propelling device wireless charging system, the size of an area of a shielder is set to be greater than an area of the wireless charging receiving end and the wireless charging transmitting end. When wireless charging is performed, if the wireless charging receiving end cannot receive all electromagnetic signals, the shielder can effectively filter out an electromagnetic signal, preventing a magnetic leakage phenomenon from occurring.

The shielder 3 may be round, square, or the like. A specific shape may be kept consistent with that of the wireless charging receiving end 2, in one aspect being relatively natural in appearance, and in another reducing amount of manufacturing material of the shielder 3 and reducing the costs is the second. To fully reduce the magnetic leakage, the shielder 3 may be manufactured by using an MnZn power ferrite material. The MnZn power ferrite material has features such as low loss and high stability (low disaccommodation and low temperature coefficient), and can filter electromagnetic signals relatively well. The shielder 3 may be directly mounted in the shell, for example, may be directly fastened in the shell by using a screw, or may be fastened in the shell by using a cementing medium. In addition, as shown in FIG. 23, a central location of the shielder 3 needs to be aligned with a central location of the wireless charging receiving end 2.

The wireless charging requires the wireless charging transmitting end 1 and the wireless charging receiving end 2 to satisfy a location relationship. Therefore, as shown in FIG. 22, generally a boundary line 4 is disposed on the wireless charging station. The boundary line 4 can transmit a boundary line signal. An automatic self-propelling device can find the wireless charging station by moving along the boundary line 4, and can be charged after the wireless charging transmitting end 1 and the wireless charging receiving end 2 satisfy the location relationship. To find accurately a location of the wireless charging station, two boundary line sensors that can identify the boundary line 4 may be disposed in the shell of the automatic self-propelling device, and the two boundary line sensors can both receive a boundary line signal. The two boundary line sensors may be symmetrically disposed on two sides of the automatic self-propelling device. When the automatic self-propelling device moves along the boundary line, the two boundary line sensors can compare values of intensity of the received boundary line signal, and slowly adjust the moving wheel of the automatic self-propelling device to the left or right, so that the boundary line 4 is longitudinally located at a central location of the automatic self-propelling device.

Figure 25:
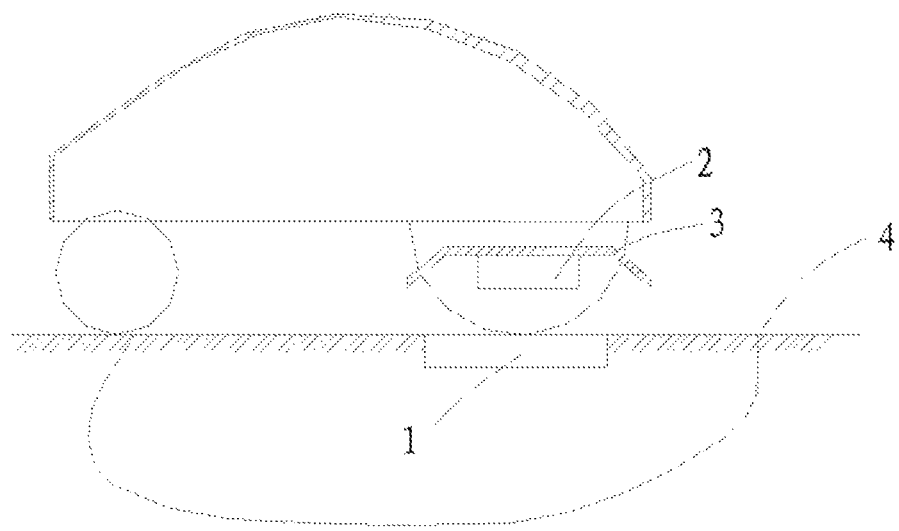
FIG. 25 is a structural diagram of a wireless charging transmitting end and a wireless charging receiving end after alignment according to an embodiment.

The wireless charging station can be found by using the two boundary line sensors. However, when the automatic self-propelling device moves along the boundary line 4, it needs to be determined whether the wireless charging transmitting end 1 and the wireless charging receiving end 2 are correctly aligned. Generally, when the wireless charging transmitting end 1 and the wireless charging receiving end 2 are correctly aligned, a voltage and an electric wave signal that are generated by the wireless charging receiving end 2 also reach an anticipated maximum value. Therefore, a detection circuit may be disposed in the shell, to detect whether the wireless charging receiving end reaches an optimal charging status. The detection circuit needs to be connected between the battery and the wireless charging receiving end, and the detection circuit may be a voltage detection circuit or a current detection circuit. As shown in FIG. 25, when the automatic self-propelling device accurately moves along the boundary line 4 to reach on the wireless charging transmitting end 1, the wireless charging transmitting end 1 and the wireless charging receiving end 2 are already correctly aligned. Therefore, a current and a voltage that are generated by the wireless charging receiving end 2 also reach maximum values, and the detection circuit can detect whether the current or the voltage generated by the wireless charging receiving end 2 reaches a predetermined value. If the current or the voltage reaches the predetermined value, it indicates that the wireless charging transmitting end 1 and the wireless charging receiving end 2 are already correctly aligned, and the automatic self-propelling device can be directed to stop moving. Specifically, the detection circuit may be connected to a controller in the automatic self-propelling device, and the detection circuit can detect whether a voltage or a current in a charging circuit of the wireless charging receiving end 2 reaches a predetermined value, and if the voltage or the current reaches the predetermined value, the detection circuit may send an instruction for stopping moving to the controller, to direct the automatic self-propelling device to stop moving; or if the voltage or the current does not reach the predetermined value, the automatic self-propelling device may continue to move along the boundary line 4 under the control of the two boundary line sensors.

Figure 26:
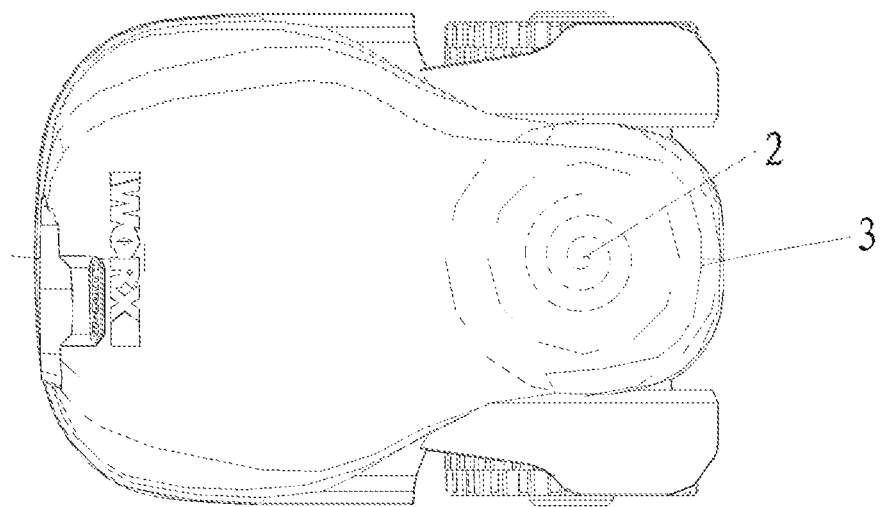
FIG. 26 is a structural diagram of a lawn mower as an automatic self-propelling device.

The automatic self-propelling device may be a lawn mower, or may be another automatic self-propelling device. In this embodiment, it is further described by taking the lawn mower for example. As shown in FIG. 26, the wireless charging receiving end 2 and the shielder 3 may be disposed in a shell of the lawn mower, and an area of the shielder 3 is greater than an area of the wireless charging receiving end 2 and the wireless charging transmitting end 1. Two boundary line sensors may be further disposed in the shell of the lawn mower, and a detection circuit may be disposed between a battery of the lawn mower and the wireless charging receiving end 2.

Figure 27:
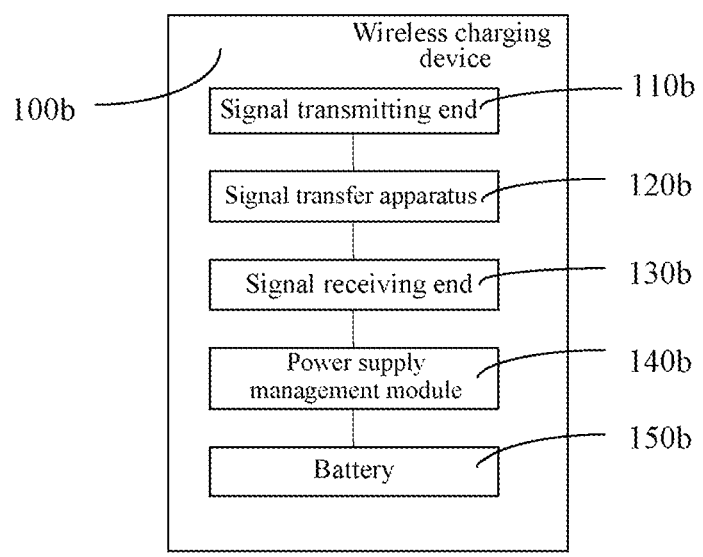
FIG. 27 is a schematic modular diagram of an autonomous lawn mower wireless charging device according to a preferred embodiment of the present invention.
Figure 28:
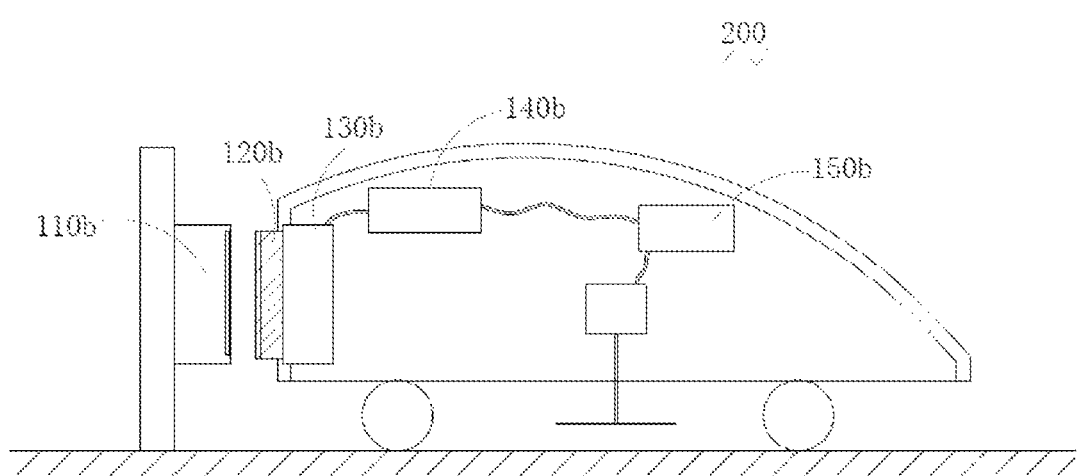
FIG. 28 is a first schematic structural diagram of an autonomous lawn mower wireless charging device according to a preferred embodiment of the present invention.
Figure 29:
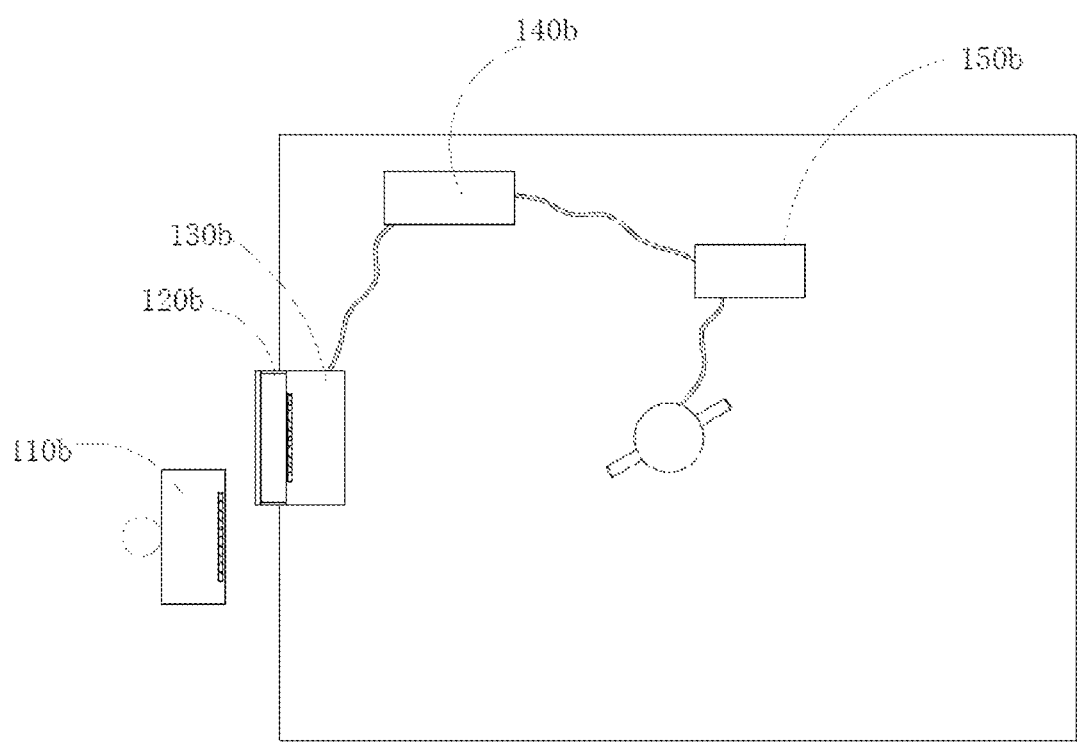
FIG. 29 is a second schematic structural diagram of an autonomous lawn mower wireless charging device according to a preferred embodiment of the present invention.

The following describes another embodiment of the present invention with reference to FIG. 27 to FIG. 29.

Referring to FIG. 27, FIG. 28, and FIG. 29, FIG. 27 is a schematic modular diagram of an autonomous lawn mower wireless charging device according to an embodiment, FIG. 28 is a first schematic structural diagram of an autonomous lawn mower wireless charging device according to an embodiment, and FIG. 29 is a second schematic structural diagram of an autonomous lawn mower wireless charging device. This embodiment discloses a wireless charging device, to perform wireless charging on an autonomous lawn mower 200. The wireless charging device 100b includes a wireless charging transmitting end, that is, a signal transmitting end 110b, a wireless charging receiving end, that is, a signal receiving end 130b, and a signal transfer apparatus 120b. The signal transmitting end 110b is configured to transmit a charging signal. The signal receiving end 130b is disposed on one end of the autonomous lawn mower 200, and is configured to receive the charging signal sent by the signal transmitting end 110b. The signal transfer apparatus 120b is disposed between the signal transmitting end 110b and the signal receiving end 130b, and may be disposed on the signal transmitting end 110b, or may be disposed on the signal receiving end 130b. The signal transfer apparatus 120b can receive the charging signal sent by the signal transmitting end 110b, and transmit the charging signal to the signal receiving end 130b.

Specifically, the charging signal sent by the signal transmitting end 110b is an electromagnetic signal. The signal transfer apparatus 120b includes a signal conversion unit, and the signal conversion unit may be a coil or a magnetic material. The signal transfer apparatus 120b uses the signal conversion unit to receive an electromagnetic signal sent by the signal transmitting end 110b, and forwards the electromagnetic signal to the signal receiving end 130b. Specifically, the signal conversion unit may include a relay node, such as a coil. By performing an electrical coupling action, the signal conversion unit generates an electric field from a varying magnetic field generated by the signal transmitting end, and then converts the electric field into a varying magnetic field. The varying magnetic field exchanges energy with the receiving end 130b, so that the receiving end 130b receives a charging signal, and then the signal receiving end 130b can perform, even at a place relatively distant from the signal transfer apparatus 120b, wireless charging on the autonomous lawn mower.

The signal transfer apparatus may further include a wireless charging receiving end and a wireless charging transmitting end. The wireless charging receiving end includes a receiving coil, configured to receive the charging signal from the signal transmitting end 110b. The wireless charging transmitting end includes a transmitting coil, configured to receive electric energy from the wireless charging receiving end, convert the electric energy into a charging signal, and send the charging signal to the signal receiving end 130b.

More specifically, the signal receiving end 130b is located on a side surface of the autonomous lawn mower 200b, and the signal transmitting end 110b is fastened at a location. The fastening location is better fixed at a height approximately the same as that of the signal receiving end 130b. In this way, the signal receiving end 130b receives a signal better.

To store the charging signal (an electromagnetic signal) sent by the signal transmitting end 110b, the wireless charging device 100b further includes a battery 150b and a power supply management module 140b. The power supply management module 140b is electrically connected to the signal receiving end 130b and the battery 150b. The power supply management module 140b processes the electromagnetic signal received by the signal receiving end 120b, converts the electromagnetic signal into a current signal, and stores the current signal thereof in the battery in a form of electric energy.

In this way, after the electric energy is stored in the battery 150b, when the lawn mower needs to continue to work, the battery may continue to provide electric energy for a motor of the lawn mower, so that the lawn mower continues to work.

The wireless charging device 100b may use the signal transfer apparatus 120b to transfer the charging signal (an electromagnetic signal) sent by the signal transmitting end 110b, and may amplify the electromagnetic signal transmitted by the signal transmitting end 110b. When the signal receiving end 130b is close to the signal transfer apparatus 120b, a charging effect can be achieved, without needing to dock the signal receiving end to the signal transmitting end. In this way, there is no need to make a transmitting end and a receiving end of a charging device be aligned as much as possible. If a deviation occurs when the receiving end docks to the transmitting end, generally a relatively good charging effect can be achieved when an area of overlap between the signal receiving end 130b and the signal transmitting end 110b is less than 80% of an area of the signal receiving end 130b or the signal transmitting end 110b. In addition, the signal receiving end 130b may use the signal transfer apparatus 120b to receive a charging signal at a location more than 5 cm from the signal transmitting end 110b, and charge the autonomous lawn mower, preventing that the signal receiving end 130b cannot successfully dock to the signal transmitting end 110b and charging fails, and reducing the technique costs of controlling the signal receiving end 130b to dock to and the signal transmitting end 110b. On the other hand, by using the signal transfer apparatus 120b, the efficiency of the signal receiving end 130b receiving the charging signal and thereby charging the autonomous lawn mower is increased by 20% to 50%, greatly increasing the efficiency of charging the autonomous lawn mower.

In this embodiment, the wireless charging device can be mounted more conveniently. In particular, a power line can be prevented from being pulled out to a lawn to provide a power for the wireless charging station. For example, in a specific scenario in this embodiment, the signal transmitting end 110b is mounted on an indoor wall near a lawn, and the signal transfer apparatus 120b is mounted on opposite of the wall, and is align with or basically align with the signal transmitting end 110b. The signal transmitting end 110b transmits the charging signal through the wall to the signal transfer apparatus 120b, and then the signal transfer apparatus 120b transmits the charging signal to the signal receiving end 130b on the autonomous lawn mower. In this way, the autonomous lawn mower moves to the signal transfer apparatus 120b outside the wall for charging. A user does not need to arrange a power line outdoor.

The described embodiments are merely some embodiments of the present invention, which are specifically and detailedly described. However, it should not be understood as a limitation to the patent scope of the present invention. It should be noted that, a person of ordinary skill in the art may further make variations and improvements without departing from the conception of the present disclosure, and these all fall within the protection scope of the present disclosure.

The invention claimed is:

1. An autonomous moving device wireless charging system, comprising an autonomous moving device and a wireless charging station, wherein:
   the wireless charging station comprises a wireless charging transmitting end;
   the autonomous moving device comprises a wireless charging receiving coil and a battery;
   the wireless charging receiving coil is configured to receive a charging signal transmitted by the wireless charging transmitting end, the charging signal transmitting an electric energy and being used for generating an induced voltage or current in the wireless charging receiving coil to charge the battery;

the battery is electrically connected to the wireless charging receiving coil and is configured to receive the electric energy transmitted from the wireless charging receiving coil; and the autonomous moving device is configured to:
determine, based on a detected intensity, at the wireless charging receiving coil, of the charging signal transmitted by the wireless charging transmitting end, satisfying a threshold, that the autonomous moving device is at a charging location; and in response to determining that the autonomous moving device is at the charging location, dock at the charging location.

2. The autonomous moving device wireless charging system according to claim 1, wherein the autonomous moving device is further configured to:
locate a location of the wireless charging station; and
move towards the location of the wireless charging station.

3. The autonomous moving device wireless charging system according to claim 2, wherein:
the autonomous moving device wireless charging system further comprises a directing line that extends outwards from the wireless charging station, and
the autonomous moving device is further configured to:
search for the directing line, and
move along the directing line to reach the wireless charging station.

4. The autonomous moving device wireless charging system according to claim 3, wherein: the directing line is a signal line for transmitting an electromagnetic signal outwards, and the autonomous moving device is configured to search for the directing line using an electromagnetic signal sensor.

5. The autonomous moving device wireless charging system according to claim 2, wherein: the autonomous moving device is configured to locate the location of the wireless charging station using at least one of a GPS module, a Bluetooth module, a Zigbee module, or a WiFi module.

6. The autonomous moving device wireless charging system according to claim 1, wherein: the autonomous moving device is configured to determine that the autonomous moving device is at the charging location based further on detecting that a current or a voltage generated on a charging circuit of the battery by the charging signal reaches a predetermined value.

7. The autonomous moving device wireless charging system according to claim 1, wherein the autonomous moving device is further configured to: determine a distance from the autonomous moving device to the charging location according to the detected intensity of the charging signal, and move towards the charging location according to the distance or a change of the distance.

8. The autonomous moving device wireless charging system according to claim 7, wherein the autonomous moving device is further configured to: when the distance is decreased to a first preset distance, reduce a moving speed of the autonomous moving device.

9. The autonomous moving device wireless charging system according to claim 1, wherein:
a locating element is disposed on the wireless charging station,
the autonomous moving device further comprises a locating sensor for detecting the locating element, and
when the locating sensor detects that the locating sensor and the locating element are in a preset location relationship, the autonomous moving device is configured to determine that the autonomous moving device is at the charging location.

10. The autonomous moving device wireless charging system according to claim 9, wherein: the locating element is a magnet, and the locating sensor is a magneto sensitive element.

11. The autonomous moving device wireless charging system according to claim 1, wherein: the autonomous moving device and the wireless charging station are both provided with an electromagnet, or one of the autonomous moving device and the wireless charging station is provided with a permanent magnet; the autonomous moving device is further configured to monitor intensity of a magnetic force between the autonomous moving device and the wireless charging station, and when the magnetic force is greater than a preset value, determine that the autonomous moving device is at the charging location.

12. The autonomous moving device wireless charging system according to claim 1, wherein: a shielder is disposed above the wireless charging receiving coil, an area of the shielder is greater than respective areas of the wireless charging transmitting end and the wireless charging receiving coil.

13. The autonomous moving device wireless charging system according to claim 1, further comprising a wireless charging transfer apparatus, wherein the wireless charging transfer apparatus is in communication with the wireless charging transmitting end and the wireless charging receiving coil, and is configured to receive the charging signal sent by the wireless charging transmitting end, and transmit the charging signal to the wireless charging receiving coil.

14. The autonomous moving device wireless charging system according to claim 13, wherein: the wireless charging transfer apparatus is disposed on either of the wireless charging station and the autonomous moving device.

15. The autonomous moving device wireless charging system according to claim 13, wherein: when the autonomous moving device is located at the charging location, a distance between the wireless charging transmitting end and the wireless charging receiving coil is greater than 5 centimeters.

16. The autonomous moving device wireless charging system according to claim 13, wherein: when the autonomous moving device is located at the charging location, an area of overlap between the wireless charging transmitting end and the wireless charging receiving coil is less than 80% of an area of the wireless charging transmitting end or the wireless charging receiving coil.

17. The autonomous moving device wireless charging system according to claim 1, wherein: the autonomous moving device is further configured to: detect a voltage of the battery, and when the voltage of the battery is less than a preset value, return to the wireless charging station.

18. The autonomous moving device wireless charging system according to claim 1, wherein: at the charging location, the wireless charging transmitting end and the wireless charging receiving coil are aligned.

19. The autonomous moving device wireless charging system according to claim 1, wherein the autonomous moving device is further configured to:
roughly locate an approximate location of the wireless charging station by a wireless locating module of the autonomous moving device, and move towards the approximate location of the wireless charging station based at least in part on the wireless locating module; and find a directing line extended outwards from the wireless charging station by a directing line search module of the autonomous moving device, and move along the directing line to reach the wireless charging station after the directing line is found.

20. An autonomous moving device wireless charging system, comprising an autonomous moving device and a wireless charging station, wherein:

the wireless charging station comprises a wireless charging transmitting end;

the autonomous moving device comprises a wireless charging receiving coil and a battery;

the wireless charging receiving coil is configured to receive a charging signal transmitted by the wireless charging transmitting end, the charging signal transmitting an electric energy and being used for generating an induced voltage or current in the wireless charging receiving coil to charge the battery;

the battery is electrically connected to the wireless charging receiving coil and is configured to receive the electric energy transmitted from the wireless charging receiving coil; and the autonomous moving device is configured to:

determine a distance from the autonomous moving device to a charging location;

move towards the charging location according to the distance or a change of the distance;

determine that the autonomous moving device is at the charging location; and in response to determining that the autonomous moving device is at the charging location, dock at the charging location, wherein when the distance is decreased to a first preset distance, the autonomous moving device is configured to reduce a moving speed of the autonomous moving device, and when the distance is decreased to a second preset distance, the autonomous moving device is configured to stop moving, and the second preset distance is smaller than the first preset distance.

* * * * *